US012795702B2

(12) United States Patent
Nguyen et al.

(10) Patent No.: US 12,795,702 B2
(45) Date of Patent: Nov. 10, 2026

(54) UNIFIED SIGNALING TO SUPPORT USER EQUIPMENT COORDINATION FOR SIDELINK

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Hui Guo, Beijing (CN); Shuanshuan Wu, San Diego, CA (US); Kapil Gulati, Belle Mead, NJ (US)

(73) Assignee: Qualcomm Incorporated, San Diego, CA (US)

( * ) Notice: Subject to any disclaimer, the term of this patent is extended or adjusted under 35 U.S.C. 154(b) by 293 days.

(21) Appl. No.: 18/574,687

(22) PCT Filed: Aug. 9, 2022

(86) PCT No.: PCT/CN2022/111104
§ 371 (c)(1),
(2) Date: Dec. 27, 2023

(87) PCT Pub. No.: WO2023/016443
PCT Pub. Date: Feb. 16, 2023

(65) Prior Publication Data

US 2024/0298338 A1 Sep. 5, 2024

(51) Int. Cl.
*H04W 72/40* (2023.01)
*H04W 72/0453* (2023.01)

(52) U.S. Cl.
CPC ....... *H04W 72/40* (2023.01); *H04W 72/0453* (2013.01)

(58) Field of Classification Search
CPC ............. H04W 72/40; H04W 72/0453; H04W 72/0446; H04W 72/02; H04W 72/04; H04W 72/044; H04W 72/12; H04W 72/26
(Continued)

(56) References Cited

U.S. PATENT DOCUMENTS 12,047,961 B2 * 7/2024 Li .......................... H04W 76/16
2021/0099918 A1 * 4/2021 Sarkis .................... H04L 5/0055
(Continued)

FOREIGN PATENT DOCUMENTS

CN 109587790 A 4/2019
CN 112423393 A 2/2021
(Continued)

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, 3GPP TSs 38.213, 3rd Generation Partnership Project (3GPP), Mobile Competence Centre, 650, Route Des Lucioles, F-06921 Sophia-Antipolis Cedex, France, vol. RAN WG1, No. V16.6.0, Jun. 30, 2021, pp. 1-187, XP052029954, section 16.
(Continued)

*Primary Examiner* — Asad M Nawaz
*Assistant Examiner* — Michael Wayne Maddox
(74) *Attorney, Agent, or Firm* — HOLLAND & HART LLP

(57) ABSTRACT

Methods, systems, and devices for wireless communications are described. Generally, a user equipment (UE) may identify a set of time and frequency resources reserved by one or more second UEs for one of sidelink transmissions by the one or more second UEs to the first UE or to one or more third UEs (e.g., type A), or sidelink transmissions by the first
(Continued)

UE to one or more third UEs (e.g., type B), and may select a first indicator and a second indicator for the reservation. The first indicator of a time resource and the second indicator of a frequency resource may be associated with the identified set of time and frequency resources for the reservation. The UE may transmit a coordination message that includes the first indicator and the second indicator, and includes an indication that the message is associated with type A or type B reservations.

26 Claims, 13 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2021/0136732 | A1 | 5/2021 | Fakoorian et al. | |
| 2021/0176669 | A1 | 6/2021 | Fakoorian et al. | |
| 2021/0282174 | A1* | 9/2021 | Cao | H04W 72/02 |
| 2022/0330281 | A1* | 10/2022 | Lee | H04L 1/1896 |
| 2022/0400479 | A1* | 12/2022 | Cao | H04W 36/0055 |
| 2023/0180216 | A1* | 6/2023 | Hwang | H04W 72/0453 370/329 |
| 2023/0363048 | A1* | 11/2023 | Park | H04W 28/0268 |
| 2023/0371005 | A1* | 11/2023 | Cai | H04W 72/25 |
| 2024/0015755 | A1* | 1/2024 | Pan | H04W 72/25 |

FOREIGN PATENT DOCUMENTS

| | | | |
|---|---|---|---|
| CN | 112637895 | A | 4/2021 |
| CN | 112840733 | A | 5/2021 |
| EP | 4426026 | A1 | 9/2024 |

OTHER PUBLICATIONS

Huawei., et al., "Inter-UE Coordination in Sidelink Resource Allocation", 3GPP TSG RAN WG1 Meeting #106-e, R1-2106478, 3rd Generation Partnership Project, Mobile Competence Centre, 650, Route Des Lucioles, F-06921 Sophia-Antipolis Cedex, France, vol. RAN WG1, No. E-meeting, Aug. 16, 2021-Aug. 27, 2021, Aug. 7, 2021, XP052037806, 33 Pages, section 3.4.

Supplementary European Search Report—EP22855424—Search Authority—The Hague—Jun. 25, 2025.

"3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V16.6.0, Jun. 30, 2021 (Jun. 30, 2021), pp. 1-187, XP052029954.

CMCC: "Discussion on Enhancements for Mode-2 Resource Allocation", 3GPP Draft, 3GPP TSG RAN WG1 #104b-e, R1-2102898, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021 (Apr. 6, 2021), XP051993280, 7 Pages, sections 1, 3.1, 3.4.1.2, 3.5, 3.5.1.2, table 1.

Huawei., et al., "Inter-UE Coordination in Sidelink Resource Allocation", 3GPP TSG RAN WG1 Meeting #106-e, R1-2106478, 3rd Generation Partnership Project, Mobile Competence Centre, 650, Route Des Lucioles, F-06921 Sophia-Antipolis Cedex, France, vol. RAN WG1, No. E-meeting, Aug. 16, 2021-Aug. 27, 2021, Aug. 7, 2021, XP052037806, 33 Pages.

International Search Report and Written Opinion—PCT/CN2021/111663—ISA/EPO—Feb. 23, 2022.

International Search Report and Written Opinion—PCT/CN2022/111104—ISA/EPO—Nov. 1, 2022.

ZTE, et al., "NR Sidelink Physical Layer Structure", 3GPP TSG RAN WG1 #99, R1-1912514, Nov. 22, 2019, 12 Pages, The Whole Document.

* cited by examiner

UNIFIED SIGNALING TO SUPPORT USER EQUIPMENT COORDINATION FOR SIDELINK

CROSS REFERENCES

The present application is a 371 national stage filing of International PCT Application No. PCT/CN2022/111104 by NGUYEN et al. entitled "UNIFIED SIGNALING TO SUPPORT USER EQUIPMENT COORDINATION FOR SIDELINK," filed Aug. 9, 2022; and claims priority to International PCT Application No. PCT/CN2021/111663 by NGUYEN et al., entitled "UNIFIED SIGNALING TO SUPPORT USER EQUIPMENT COORDINATION FOR SIDELINK," filed Aug. 10, 2021, each of which is assigned to the assignee hereof, and each of which is expressly incorporated by reference in its entirety herein.

FIELD OF TECHNOLOGY

The following relates to wireless communications, including unified signaling to support user equipment coordination for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support unified signaling to support user equipment coordination for sidelink. Generally, an inter-user equipment (UE) coordination message may indicate time and frequency resources that are granting resources for a transmission by the receiving UE (e.g., type A) or indicating resources to be avoided for the receiving UE (e.g., self-reservation or type B). A single signaling structure may be used for both type A and type B inter-UE coordination, including an indication of whether the resources are associated with a type A inter-UE coordination message or a type B inter-UE coordination message. The indication of time resources may exceed a threshold quantity of slots (e.g., 31 slots) by changing how a time domain resource indicator (TDRI) field in the coordination message is interpreted. In some examples, the coordination may use a TDRI field to indicate a timing of reserved resources. However, the value of the TDRI field may be limited by a pre-configured or fixed threshold value. In some examples, the TDRI field may be limited by a threshold (e.g., 31 slots), but may be applied to an offset value (an offset quantity of slots after the inter-UE coordination message), allowing for the time resources to be reserved more than 31 slots after transmission of the inter-UE coordination message. In some examples, the TDRI field may be limited by a threshold (e.g., 31 slots), but the receiving UE may interpret the TDRI indicator differently (e.g., at a different granularity, such as a reduced granularity level corresponding to a greater number of slots or by adding the different TDRI values to each other, instead of to a fixed reference point like the received coordination message).

Having identified the resources based on the TDRI and FDRI fields, the receiving UE may determine whether the resources are reserved for use by the receiving UE, or are reserved for use by the transmitting UE (e.g., self-reservation). For example, if the inter-UE coordination message reserves resources for the receiving UE (e.g., a grant of sidelink resources), then the inter-UE coordination message may include device identifiers for both UEs, or a link identifier for the link between the UEs. The device identifiers may be negotiated, fixed, or selected to avoid duplication. In the case of self-reservation, the inter-UE coordination message may include a single device identifier (e.g., for the transmitting UE or a preconfigured value indicating self-configuration).

A method for wireless communications at a first user equipment (UE) is described. The method may include identifying a set of time and frequency resources reserved by one or more second UEs for one of sidelink transmissions by the one or more second UEs to the first UE or to one or more third UEs, or sidelink transmissions by the first UE to one or more third UEs, selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation, and transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

An apparatus for wireless communications at a first UE is described. The apparatus may include a processor, memory coupled with the processor, and instructions stored in the memory. The instructions may be executable by the processor to cause the apparatus to identify a set of time and frequency resources reserved by one or more second UEs for one of sidelink transmissions by the one or more second UEs to the first UE or to one or more third UEs, or sidelink transmissions by the first UE to one or more third UEs, select a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation, and transmit, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

Another apparatus for wireless communications at a first UE is described. The apparatus may include means for identifying a set of time and frequency resources reserved by one or more second UEs for one of sidelink transmissions by the one or more second UEs to the first UE or to one or more third UEs, or sidelink transmissions by the first UE to one or more third UEs, means for selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation, and means for transmitting, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

A non-transitory computer-readable medium storing code for wireless communications at a first UE is described. The code may include instructions executable by a processor to identify a set of time and frequency resources reserved by one or more second UEs for one of sidelink transmissions by the one or more second UEs to the first UE or to one or more third UEs, or sidelink transmissions by the first UE to one or more third UEs, select a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation, and transmit, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

In some examples of the method, apparatuses, and non-transitory computer-readable medium described herein, selecting the first indicator may include operations, features, means, or instructions for determining that a time interval between the message and the time resource satisfies a threshold amount of time, where selecting the first indicator of the time resource may be based on the time interval satisfying the threshold amount of time, and the threshold amount of time may be associated with a message format usable for reservations for the sidelink transmissions by the one or more second UEs to the first UE or to the one or more third UEs, and the sidelink transmissions by the first UE to the one or more third UEs.

Some examples of the method, apparatuses, and non-transitory computer-readable medium described herein may further include operations, features, means, or instructions for receiving control signaling including an indication of the threshold amount of time.

In some examples of the method, apparatuses, and non-transitory computer-readable medium described herein, selecting the first indicator may include operations, features, means, or instructions for identifying an offset value for the time resource based on the reservation being for the one of the sidelink transmissions by the one or more second UEs to the first UE or to the one or more third UEs, or the sidelink transmissions by the first UE to the one or more third UEs and selecting the first indicator for the reservation based on the offset value for the time resource.

Some examples of the method, apparatuses, and non-transitory computer-readable medium described herein may further include operations, features, means, or instructions for receiving, from a base station, the one or more second UEs, or the one or more third UEs, an indication of the offset value for the time resource.

Some examples of the method, apparatuses, and non-transitory computer-readable medium described herein may further include operations, features, means, or instructions for generating the indication that the message may be associated with the reservation for the sidelink transmissions by the one or more second UEs to the first UE or to the one or more third UEs, the indication including a source identifier for the first UE and a destination identifier for the one or more second UEs.

Some examples of the method, apparatuses, and non-transitory computer-readable medium described herein may further include operations, features, means, or instructions for performing a negotiation procedure with the one or more second UEs to determine the source identifier and the destination identifier.

In some examples of the method, apparatuses, and non-transitory computer-readable medium described herein, the source identifier includes a device identifier for the first UE and the destination identifier includes a device identifier for the one or more second UEs.

Some examples of the method, apparatuses, and non-transitory computer-readable medium described herein may further include operations, features, means, or instructions for generating the indication that the message may be associated with the reservation for the sidelink transmissions by the one or more second UEs to the first UE or to the one or more third UEs, the indication including a first link identifier for a sidelink between the first UE and the one or more second UEs.

In some examples of the method, apparatuses, and non-transitory computer-readable medium described herein, the first link identifier includes a device identifier for the one or more second UEs.

Some examples of the method, apparatuses, and non-transitory computer-readable medium described herein may further include operations, features, means, or instructions for performing a negotiation procedure with the one or more second UEs to determine the first link identifier for the sidelink.

Some examples of the method, apparatuses, and non-transitory computer-readable medium described herein may further include operations, features, means, or instructions for monitoring the sidelink between the first UE and the one or more second UEs, one or more sidelinks between the first UE and the one or more third UEs, or any combination thereof, identifying a second link identifier based on the monitoring, and selecting the first link identifier based on the first link identifier being different from the second link identifier.

Some examples of the method, apparatuses, and non-transitory computer-readable medium described herein may further include operations, features, means, or instructions for generating the indication that the message may be associated with the reservation for the sidelink transmissions by the first UE to the one or more third UEs, the indication including an identifier for the first UE.

In some examples of the method, apparatuses, and non-transitory computer-readable medium described herein, the identifier includes a device identifier for the first UE.

Some examples of the method, apparatuses, and non-transitory computer-readable medium described herein may further include operations, features, means, or instructions for receiving, from the network, an indication of the identifier for the first UE.

A method for wireless communications at a second UE is described. The method may include receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs, determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs, selecting, based on the determined first set of time and frequency resources for the reservation, a second set of time and frequency resources for one or more data messages to be transmitted, where the first set of time and frequency resources do not overlap with the first set of time and frequency resources, and transmitting the one or more data messages using at least a portion of the selected second set of time and frequency resources.

An apparatus for wireless communications at a second UE is described. The apparatus may include a processor, memory coupled with the processor, and instructions stored in the memory. The instructions may be executable by the processor to cause the apparatus to receive, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs, determine a first set of time and frequency resources for the reservation based on the first indicator, the second indicator, and the reservation being for one of the sidelink transmissions to the first UE or to the one or more third UEs, or the sidelink transmissions by the first UE to the one or more third UEs, select, based on the determined first set of time and frequency resources for the reservation, a second set of time and frequency resources for one or more data messages to be transmitted, where the first set of time and frequency resources do not overlap with the first set of time and frequency resources, and transmit the one or more data messages using at least a portion of the selected second set of time and frequency resources.

Another apparatus for wireless communications at a second UE is described. The apparatus may include means for receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs, means for determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs, means for selecting, based on the determined first set of time and frequency resources for the reservation, a second set of time and frequency resources for one or more data messages to be transmitted, where the first set of time and frequency resources do not overlap with the first set of time and frequency resources, and means for transmitting the one or more data messages using at least a portion of the selected second set of time and frequency resources.

A non-transitory computer-readable medium storing code for wireless communications at a second UE is described. The code may include instructions executable by a processor to receive, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs, determine a first set of time and frequency resources for the reservation based on the first indicator, the second indicator, and the reservation being for one of the sidelink transmissions to the first UE or to the one or more third UEs, or the sidelink transmissions by the first UE to the one or more third UEs, select, based on the determined first set of time and frequency resources for the reservation, a second set of time and frequency resources for one or more data messages to be transmitted, where the first set of time and frequency resources do not overlap with the first set of time and frequency resources, and transmit the one or more data messages using at least a portion of the selected second set of time and frequency resources.

In some examples of the method, apparatuses, and non-transitory computer-readable medium described herein, determining the first set of time and frequency resources may include operations, features, means, or instructions for applying an offset value to the first indicator of the time resource to determine a time interval between the message and the time resource of the first set of time and frequency resources.

In some examples of the method, apparatuses, and non-transitory computer-readable medium described herein, determining the first set of time and frequency resources may include operations, features, means, or instructions for identifying a threshold amount of time for the first indicator of the time resource, the threshold amount of time associated with a message format usable for reservations for the sidelink transmissions to the first UE or to the one or more third UEs, and the sidelink transmissions by the first UE to the one or more third UEs and applying an offset value to the first indicator of the time resource to determine a time interval between the message and the time resource of the first set of time and frequency resources.

Some examples of the method, apparatuses, and non-transitory computer-readable medium described herein may further include operations, features, means, or instructions for receiving an indication of the threshold amount of time, the offset value, or both, where applying the offset value may be based on the indication of the threshold amount of time.

Some examples of the method, apparatuses, and non-transitory computer-readable medium described herein may further include operations, features, means, or instructions for adding the first indicator of the time resource to a third indicator of a second time resource to determine the second time resource of the second set of time and frequency resources based on the reservation being for one of the sidelink transmissions to the first UE or to the one or more third UEs, or the sidelink transmissions by the first UE to the one or more third UEs.

In some examples of the method, apparatuses, and non-transitory computer-readable medium described herein, receiving the message may include operations, features, means, or instructions for receiving the indication that the message may be associated with the reservation for the sidelink transmissions to the first UE or to the one or more third UEs, the indication including a source identifier for the first UE and a destination identifier for the second UE.

Some examples of the method, apparatuses, and non-transitory computer-readable medium described herein may further include operations, features, means, or instructions for performing a negotiation procedure with the first UE to determine the source identifier and the destination identifier, where the source identifier includes a device identifier for the first UE and the destination identifier includes a device identifier for the second UE.

Some examples of the method, apparatuses, and non-transitory computer-readable medium described herein may further include operations, features, means, or instructions for selecting a device identifier for the second UE and transmitting a scheduling request to the first UE, the scheduling request including an indication of the device identifier for the second UE, where the device identifier for the second UE may be received in the message for the reservation.

In some examples of the method, apparatuses, and non-transitory computer-readable medium described herein, receiving the message may include operations, features, means, or instructions for receiving the indication that the message may be associated with the reservation for the sidelink transmissions to the first UE or to the one or more third UEs, the indication including a first link identifier for a sidelink between the first UE and the second UE.

In some examples of the method, apparatuses, and non-transitory computer-readable medium described herein, the first link identifier includes a device identifier for the second UE.

Some examples of the method, apparatuses, and non-transitory computer-readable medium described herein may further include operations, features, means, or instructions for performing a negotiation procedure with the first UE to determine the first link identifier for the sidelink.

Some examples of the method, apparatuses, and non-transitory computer-readable medium described herein may further include operations, features, means, or instructions for selecting the first link identifier and transmitting a scheduling request to the first UE, the scheduling request including an indication of the first link identifier for the second UE, where the first link identifier may be received in the message for the reservation.

In some examples of the method, apparatuses, and non-transitory computer-readable medium described herein, receiving the message may include operations, features, means, or instructions for receiving the indication that the message may be associated with the reservation for the sidelink transmissions by the first UE to the one or more third UEs, the indication including an identifier for the first UE.

In some examples of the method, apparatuses, and non-transitory computer-readable medium described herein, the identifier includes a device identifier for the first UE.

Some examples of the method, apparatuses, and non-transitory computer-readable medium described herein may further include operations, features, means, or instructions for receiving, from the network, an indication of the identifier for the first UE.

DETAILED DESCRIPTION

Figure 1:
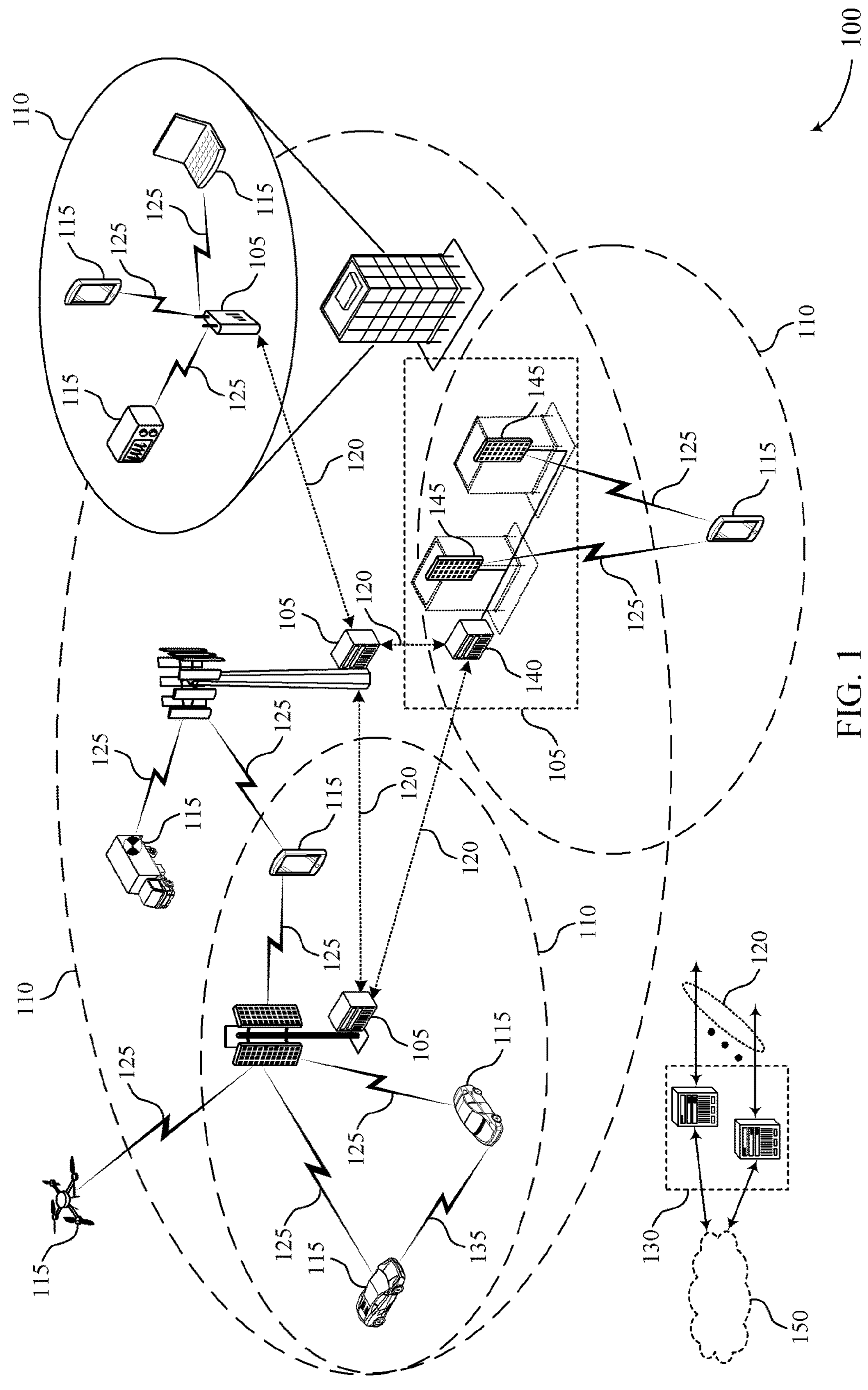
FIG. 1 illustrates an example of a wireless communications system that supports unified signaling to support user equipment coordination for sidelink in accordance with aspects of the present disclosure.

Some wireless communications system may support sidelink operations between user equipments (UEs. In some examples, UEs may coordinate resources for sidelink communication. UEs (e.g., operating in mode 2) may sense sidelink resources to determine which resources to use or avoid for sidelink communications. Coordination of resources may avoid an exposed node problem in which an area may be covered by the radio frequency footprint of a channel sensing procedure by a UE, but not by the radio frequency footprint of data or control transmissions by the same UE, which may result in unnecessary blocking of transmissions. Coordination of resources may also avoid a hidden node problem in which an area may be covered by the radio frequency footprint of data or control transmissions by a UE, but not by the radio frequency footprint of a channel sensing procedure by the same UE, which may result in high levels of interference from a node within the area that may reduce the likelihood for successful transmissions from the UE. In some examples, coordination of resources may support half duplex operations where the UE does not transmit and receive simultaneously.

The UEs may exchange UE coordination messages (which may also be referred to as reservation messages) indicating resources based on the sensing result. For instance, in type A inter-UE coordination, a first UE may transmit an indication to a second UE of a set of resources for the second UE to use (e.g., a grant) for communications with the first UE or other UEs, based on the sensing results. In type B inter-UE coordination, a first UE may transmit a coordination message to a second UE indicating a set of resources to a that are not preferred (e.g., are to be avoided) by the second UE based on the sensing results, potential or scheduled conflicts, or the like. In either example, the first UE indicates a set of resources to the second UE. However, procedures and signaling for type A and type B may be different in conventional systems, resulting in inefficient use of available resources and increased signaling overhead.

Additionally, some conventional systems may impose limitations on an amount of time after transmission of a coordination message a transmitting UE is permitted to reserve sidelink resources. This may result in decreased efficiency. Reserving sidelink resources outside of such limitations (e.g., beyond 31 slots) may result in improved system efficiency, decreased collisions and interference, decreased system latency, and improved user experience.

An inter-UE coordination message may indicate time and frequency resources that are type A or type B. A single signaling structure may be used for both type A and type B inter-UE coordination, including an indication of whether the resources are associated with a type A inter-UE coordination message or a type B inter-UE coordination message. The indication of time resources may exceed a threshold quantity of slots (e.g., 31 slots) by changing how a time domain resource indicator (TDRI) field in the coordination message is interpreted. In some examples, the coordination may use a TDRI field to indicate a timing of reserved resources. However, the value of the TDRI field may be limited by a pre-configured or fixed threshold value. In some examples, the TDRI field may be limited by a threshold (e.g., 31 slots), but may be applied to an offset value (an offset quantity of slots after the inter-UE coordination message), allowing for the time resources to be reserved more than 31 slots after transmission of the inter-UE coordination message. In some examples, the TDRI field may be limited by a threshold (e.g., 31 slots), but the receiving UE may interpret the TDRI indicator differently (e.g., at a different granularity, such as a reduced granularity level corresponding to a greater number of slots or by adding the different TDRI values to each other, instead of to a fixed reference point like the received coordination message).

Having identified the resources based on the TDRI and FDRI fields, the receiving UE may determine whether the resources are reserved for use by the receiving UE, or are reserved for use by the transmitting UE (e.g., self-reservation). For example, if the inter-UE coordination message reserves resources for the receiving UE (e.g., a grant of sidelink resources), then the inter-UE coordination message may include device identifiers for both UEs, or a link identifier for the link between the UEs. The device identifiers may be negotiated, fixed, or selected to avoid duplication. In the case of self-reservation, the inter-UE coordination message may include a single device identifier (e.g., for the transmitting UE or a preconfigured value indicating self-configuration). Techniques described herein may result in higher reliability of sidelink communications, and lower power consumption by coordinating UEs.

Aspects of the disclosure are initially described in the context of wireless communications systems. Aspects of the disclosure are further illustrated by and described with reference to wireless communications systems and timelines. Aspects of the disclosure are further illustrated by and described with reference to apparatus diagrams, system diagrams, and flowcharts that relate to unified signaling to support user equipment coordination for sidelink.

FIG. 1 illustrates an example of a wireless communications system 100 that supports unified signaling to support user equipment coordination for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval Generally, an inter-user equipment (UE) coordination message may indicate time and frequency resources that are granting resources for a transmission by the receiving UE 115 (e.g., type A) or indicating resources to be avoided for the receiving UE (e.g., type B). A single signaling structure may be used for both type A and type B inter-UE coordination, including an indication of whether the resources are associated with a type A inter-UE coordination message or a type B inter-UE coordination message. The indication of time resources may exceed a threshold quantity of slots (e.g., 31 slots) by changing how a time domain resource indicator (TDRI) field in the coordination message is interpreted. In some examples, the coordination may use a TDRI field to indicate a timing of reserved resources. However, the value of the TDRI field may be limited by a pre-configured or fixed threshold value. In some examples, the TDRI field may be limited by a threshold (e.g., 31 slots), but may be applied to an offset value (an offset quantity of slots after the inter-UE coordination message), allowing for the time resources to be reserved more than 31 slots after transmission of the inter-UE coordination message. In some examples, the TDRI field may be limited by a threshold (e.g., 31 slots), but the receiving UE may interpret the TDRI indicator differently (e.g., at a different granularity, such as a reduced granularity level corresponding to a greater number of slots or by adding the different TDRI values to each other, instead of to a fixed reference point like the received coordination message).

Having identified the resources based on the TDRI and FDRI fields, the receiving LIE may determine whether the resources are reserved for use by the receiving UE, or are reserved for use by the transmitting UE 115 (e.g., self-reservation). For example, if the inter-UE coordination message reserves resources for the receiving UE 115 (e.g., a grant of sidelink resources), then the inter-UE coordination message may include device identifiers for both UEs, or a link identifier for the link between the UEs 115. The device identifiers may be negotiated, fixed, or selected to avoid duplication. In the case of self-reservation, the inter-UE coordination message may include a single device identifier (e.g., for the transmitting UE 115 or a preconfigured value indicating self-configuration).

Figure 2:
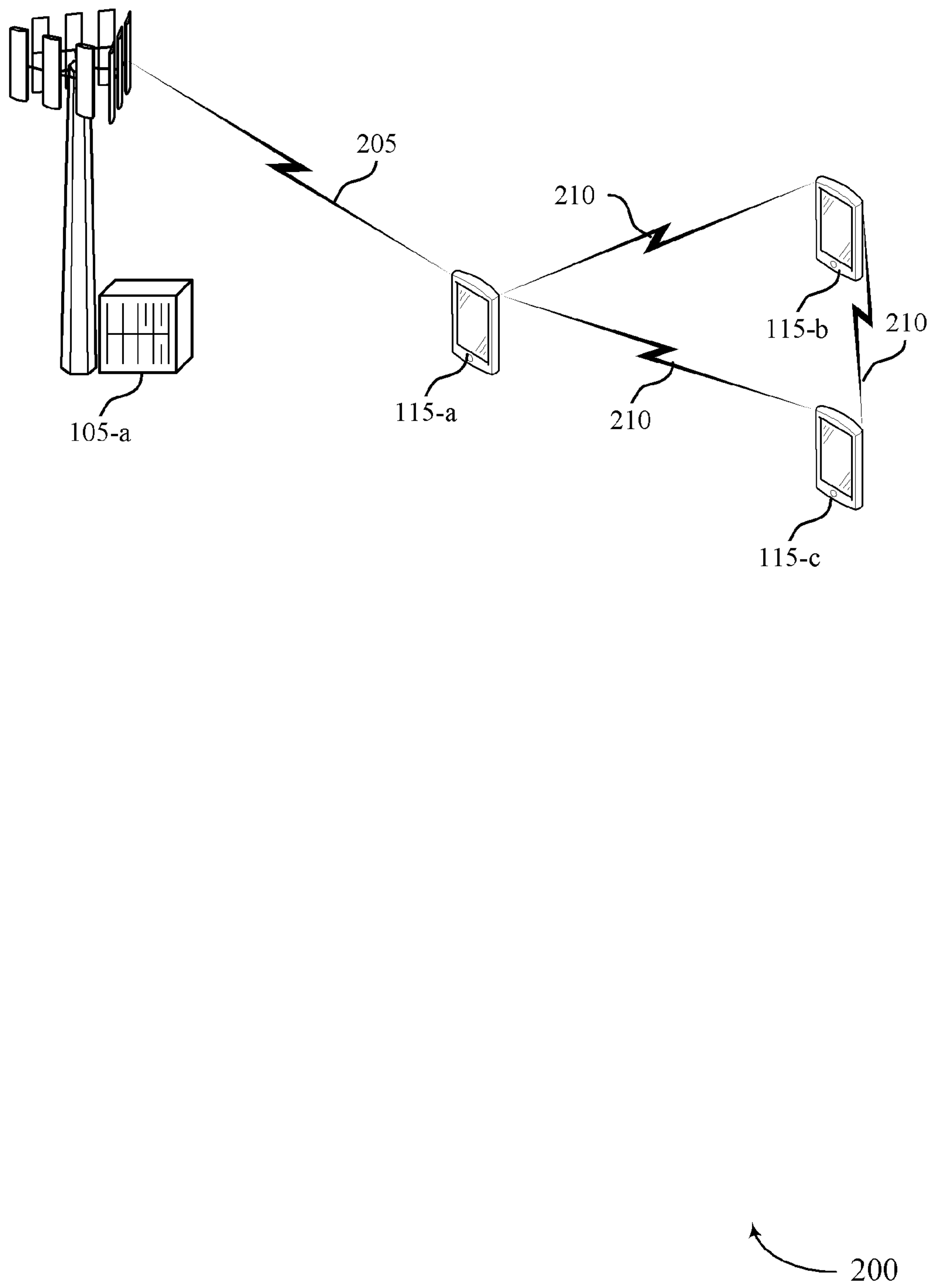
FIG. 2 illustrates an example of a wireless communications system that supports unified signaling to support user equipment coordination for sidelink in accordance with aspects of the present disclosure.

FIG. 2 illustrates an example of a wireless communications system 200 that supports unified signaling to support user equipment coordination for sidelink in accordance with aspects of the present disclosure. Wireless communications system 200 may include a base station 105-*a*, a UE 115-*a*, a UE 115-*b*, and a UE 115-*c*, which may be examples of corresponding devices described with reference to FIG. 1. The UE 115-*a* may communicate with a base station 105-*a* via wireless communication link 205 (e.g., via a Uu interface). The UEs 115 may communicate with each other via sidelink 210 (e.g., via a PC5 interface). In some examples, wireless communications system 200 may support mode 2 sidelink communications, where the UEs 115 (e.g., one or more of which may be located outside of coverage area of the base station 105-*a*) may coordinate with each other to select sidelink resources on which to communicate with each other (e.g., without instruction or input from the base station 105-*a*).

In some examples, as described with reference to FIG. 1, a UE 115-*a* may transmit a coordination message to one or more UEs 115 (e.g., to the UE 115-*b*). The UE 115-*a* may indicate a set of resources (e.g., type A resources or type B resources). The indication of the set of resources may include a TDRI field and an FRDI field. As described in greater detail with reference to FIG. 3, the TDRI may exceed a threshold time value, extending the range of the time indicators in the TDRI field such that the UE 115-*a* may indicate the set of resources a long time prior to the actual resources, resulting in improved planning and system efficiency. In some examples, as described in greater detail with reference to FIG. 4, the UE 115-*a* may include, in the coordination message, one or more TDRIs, which may be constrained by the threshold time value. However, the time indicators (e.g., in the TDRI field) may be applied to an offset value, effectively extending the range of the TDRI field. In some examples, as described in greater detail with reference to FIG. 5, the UE 115-*a* may include, in the coordination message, one or more time indicators in the TDRI field, which may be constrained by the threshold time value. However, the UE 115-*b* may receive the coordination message, and interpret the time indicators such that the effective time gap between the coordination message and one or more of the set of resources exceeds the time value threshold. For instance, one time indicator for a subset of the resources may be measured from the end of another time indicator for a second subset of the resources (e.g., instead of all time indicators in the TDRI field being measured from the resources on which the coordination message is transmitted). The coordination message may be an SCI message (e.g., SCI or SCI2), a media access control (MAC) control element (CE), a radio resource control (RRC) message, another wireless message, or any combination thereof.

The coordination message may indicate type A resources. Type A resources may indicate resources on which the receiving UE 115 is permitted to transmit. For example, the UE 115-*a* may transmit a coordination message to the UE 115-*b* on the sidelink 210. The coordination message may include an indication of type A resources (e.g., a grant of sidelink resources) on which the UE 115-*b* may transmit a sidelink message to the UE 115-*a*, or to one or more UEs 115 (e.g., a third UE 115-*c*, or a set of UEs 115 via groupcast or broadcast). Or, the coordination message may indicate type B resources. Type B resources may indicate resources which the UE 115-*a* has selected for a subsequent transmission (e.g., to the UE 115-*c*). The type B resources may indicate resource which the UE 115-*b* is to avoid. For instance, the type B resources may indicate the resources on which the UE 115-*a* is planning to transmit the sidelink message to the UE 115-*c*, and the UE 115-*b* may refrain from selecting the indicated resources, to avoid a collision with the sidelink transmission from the UE 115-*a* to the UE 115-*b*.

If the coordination message includes an indication of a set of resources, but the UE 115-*b* receiving the coordination message cannot identify which type of resources the set of resources are, then the UE 115-*b* may incorrectly utilize (e.g., or refrain from utilizing), the indicated set of resources. In some examples, as described herein, the UE 115-*a* may indicate, in the coordination message, a type for the indicated set of resources.

In some examples, the UE 115-*a* may indicate that an indicated set of resources in a coordination message are type A resources by explicitly including an indication of a source identifier and a destination identifier in the coordination message. For example, the UE 115-*a* may include its device identifier (e.g., a layer 1 (L1) identifier) in the coordination message. The source identifier may be, for example, 8 bits. In some examples (e.g., in a centralized scheme), the source identifier may be less than 8 bits (e.g., where a number of UEs 115 in a physical area is small). In some examples, the UE 115-*a* may determine a size of the UE 115-*a* based on one or more rules or preconfiguration, or based on determining a number of UEs 115 located within a threshold distance from the UE 115. In some examples, the UE 115-*a* may negotiate with one or more other scheduling UEs 115, and may select non-colliding source identifiers based on the negotiation (e.g., handshake procedure).

The UE 115-*a* may also include, in the coordination message, a destination identifier for the UE 115-*b*. The destination identifier may be a L1 identifier for the UE 115-*b*. In some examples, the destination identifier may be larger than the source identifier (e.g., 16 bits). For example, the UE 115-*a* may be scheduling a large number of other UEs 115 (e.g., including the UE 115-*b* and the UE 115-*c*). In such examples, the destination identifiers may be large enough to decrease the likelihood of collision with other UEs 115. Upon receiving the coordination message that includes the source identifier and the destination identifier, the UE 115-*b* may determine that the coordination message indicates type A resources (e.g., resources on which the UE 115-*b*, as the destination device, is allowed to select for transmission).

The UE 115-*a* may indicate that the indicated set of resources in a coordination message are type B resources by including a single identifier as both a source identifier and a destination identifier in the coordination message. For example, the UE 115-*a* may include its own source identifier in a source identifier field of the coordination message, and may include its own source identifier in a destination identifier field of the coordination message. The single identifier may be a 16-bit identifier. The single identifier may be a reserved 16-bit identifier, a 16-bit L1 identifier for the UE 115-*a*, or the like. The size of the single identifier may be large enough that the likelihood of conflicting with the identifier of another UE 115 is unlikely.

In some examples, the UE 115-*a* may indicate that a set of resources in a coordination message are type A resources by explicitly including an indication of a source identifier and a predefined identifier for the UE 115-*b* in the coordination message. For example, the UE 115-*a* may include its device identifier (e.g., a layer 1 (L1) identifier) in the coordination message. The source identifier may be, for example, 8 bits. In some examples (e.g., in a centralized scheme), the source identifier may be less than 8 bits (e.g., where a number of UEs 115 in a physical area is small). In some examples, the UE 115-*a* may determine a size of the UE 115-*a* based on one or more rules or preconfiguration, or based on determining a number of UEs 115 located within a threshold distance from the UE 115. In some examples, the UE 115-*a* may negotiate with one or more other scheduling UEs 115, and may select non-colliding source identifiers based on the negotiation (e.g., handshake procedure).

The UE 115-*a* may also include, in the coordination message, a destination identifier for the UE 115-*b*. The destination identifier may be a L1 identifier for the UE 115-*b*. In some examples, the destination identifier may be larger than the source identifier (e.g., 16 bits). For example, the UE 115-*a* may be scheduling a large number of other UEs 115 (e.g., including the UE 115-*b* and the UE 115-*c*). In such examples, the destination identifiers may be large enough to decrease the likelihood of collision with other UEs 115. Upon receiving the coordination message that includes the source identifier and the destination identifier, the UE 115-*b* may determine that the coordination message indicates type A resources (e.g., resources on which the UE 115-*b*, as the destination device, is allowed to select for transmission).

The UE 115-*b* may negotiate a unique scheduling identifier with the UE 115-*a* for indicating that the reserved resources are type A resources. In some examples the unique identifier for the UE 115-*b* may be 8 bits, or less than 8 bits. For example, the UE 115-*a* may be scheduling multiple UEs 115-*b*, but the size of the group may be smaller (e.g., less than a threshold number of UEs 115-*b*). The UE 115-*a* and the UE 115-*b* may operate in an RRC connected mode. In such examples, the UE 115-*a* and the UE 115-*b* may negotiate the unique scheduling identifier for the UE 115-*b* via an RRC connection, a scheduling request, or the like. The number of bits for the unique identifier for the UE 115-*b* may be preconfigured, standardized, or negotiated between the UEs 115. In some examples, a smaller number of bits may be supported for smaller groups (e.g., 5 bits for a group size of up to 31 UEs 115). In some examples, the size of the unique identifier may change over time. For example, as UEs 115 are added to or leave the group of UEs 115 that the UE 115-*a* is scheduling, the UE 115-*a* and the UE 115-*b* may negotiate or renegotiate a size of the unique identifier. Or, the UE 115-*a* and the UE 115-*b* may be configured with one or more threshold group sizes, and may autonomously change the size of the unique identifier for the UE 115-*b* (e.g., any destination UE 115) based on whether the size of a group of scheduled UEs 115 satisfies the a group threshold size associated with a respective number of bits. Upon receiving the coordination message including the source identifier for the UE 115-*a* and the unique identifier for the UE 115-*b*, the UE 115-*b* may determine that the indicated resources in the coordination message are type A resources.

The UE 115-*a* may indicate that the indicated set of resources in a coordination message are type B resources by including a unique identifier as both a source identifier and a destination identifier in the coordination message. The unique identifier may be network wide (e.g., 0). The network wide unique identifier for the UE 115-*a* may be preconfigured, included in one or more standards documents, or indicated to the UE 115-*a* via another UE 115, a base station 105, or the like. In some examples, the UE 115-*a* may select its own unique identifier. The unique identifier may be different than the source identifier for the UE 115-*a*. Upon receiving the coordination message including the unique identifier for the UE 115-*a*, the UE 115-*b* may determine that the received coordination message indicates type B resources. In some examples, the UE 115-*a* and the UE 115-*b* may exchange unique identifiers (e.g., selected unique identifiers during a handshake procedure), so that the UE 115-*b* recognizes the received unique identifier in the coordination message.

In some examples, the UE 115-*a* may indicate that a set of resources in the coordination message are type A resources by including a link identifier in the coordination message. The link identifier may indicate a link between the scheduled UE 115-*b* and the UE 115 to which the UE 115 is scheduled to transmit a sidelink message (e.g., the UE 115-*b* or the UE 115-*c*), or a link identifier between the UE 115-*a* and the UE 115-*b*. The link identifier may be an L1 identifier for the UE 115-*b* (e.g., an 8-bit identifier), or for the UE 115-*a*. In some examples, the link identifier may be negotiated between the UEs 115 (e.g., via RRC connection, scheduling requests, or the like). In some examples, the UEs 115 may monitor (e.g., overhear) link identifiers that are already in use by other UEs 115. For instance, the UE 115-*a* may monitor sidelink communications by the UE 115-*c*, and may determine a link identifier that the UE 115-*c* is using to schedule sidelink communications (e.g., with another UE 115). In such examples, the UE 115-*a* may transmit a coordination message to the UE 115-*b* scheduling a transmission (e.g., to the UE 115-*a*). The coordination message may include an indication of type A resources, and an indication of a link identifier for the link between the UE 115-*a* and the UE 115-*b*, or the link between the UE 115-*b* and the UE 115 to which the UE 115 is scheduled to transmit a sidelink message (e.g., the UE 115-*b* or the UE 115-*c*). The link identifier may be different than the link identifier being used by the UE 115-*c*. In some examples, a number of bits for the link identifier may be preconfigured.

The UE 115-*a* may indicate that the indicated set of resources in a coordination message are self-reservation resources for a transmission by the UE 115-*a* (e.g., type B resources) by including a reserved link identifier in the coordination message. The reserved link identifier may be network wide (e.g., 0). The network wide reserved link identifier may be preconfigured, included in one or more standards documents, or indicated to the UE 115-*a* via another UE 115, a base station 105, or the like. In some examples, the UE 115-*a* may select its own reserved link identifier. The reserved link identifier may be different than the source identifier for the UE 115-*a*. Upon receiving the coordination message including the reserved link identifier for the UE 115-*a*, the UE 115-*b* may determine that the received coordination message indicates type B resources.

In some examples, the UE 115-*a* may not use any identifier if type A resources are not in use. For example, if the network is not configured to support features for type A reservation, then all fields for identifiers may be removed (e.g., not included) in the coordination message. In such examples, a size of a sidelink control message for coordination messages (e.g., an SCI2 message) may be maintained. Or, in some examples, the UE 115-*a* may include a source identifier and a destination identifier, or a source identifier and a unique identifier, or a link identifier, to indicate type A resources. However, if the coordination message includes type B resources, then, the then the UE 115-*a* may remove the extra fields for the different device or link identifiers. The lack of any additional fields (e.g., indicating type A resources) may be interpreted by the UE 115-*b* as an indication that the resources are type B resources.

Figure 3:
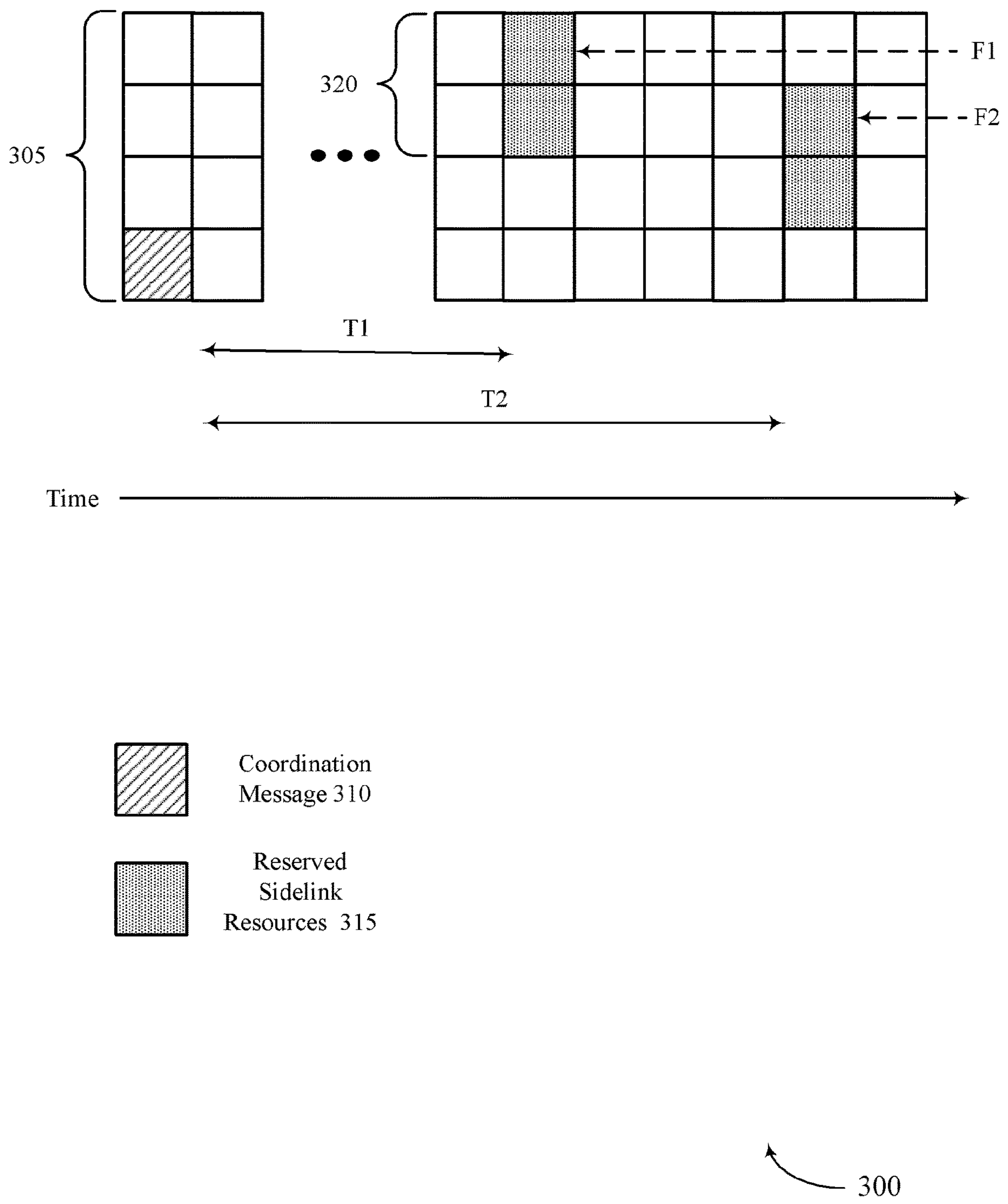
FIG. 3 illustrates an example of a timeline that supports unified signaling to support user equipment coordination for sidelink in accordance with aspects of the present disclosure.

FIG. 3 illustrates an example of a timeline 300 that supports unified signaling to support user equipment coordination for sidelink in accordance with aspects of the present disclosure. Timeline 300 may implement aspects wireless communications systems 100 and 200. For example, one or more UEs may communicate according to timeline 300. Such UEs may be examples of corresponding devices (e.g., such as UEs 115) described with reference to FIGS. 1-2.

In some examples, as described in greater detail with reference to FIG. 2, various UEs may communicate with other UEs via sidelink resources 305. A first UE may select sidelink resources 305 for a transmission from a second UE to the first UE or to one or more third UEs, or may select sidelink resources 305 for transmissions from the first UE to the one or more third UEs. The first UE may transmit a coordination message 310 on sidelink resources 305 to the second UE. The coordination message 310 may include an FDRI field indicating frequency resources for the selected resources (e.g., a single or multiple reserved sidelink resources 315), and a TDRI field indicating time resources for the reserved sidelink resources 315.

The coordination message may include a value for a number of subchannels in each subset of the reserved sidelink resources 315. For example, a first subset of reserved sidelink resources 315 (e.g., after T1) and a second subset of reserved sidelink resources 315 (e.g., after T2) may both span a set of subchannels 320 (e.g., as indicated in the coordination message via a parameter, such as $L_{SubCH}$). The FDRI field may include one or more frequency indicators (e.g., F1 and F2). Each frequency indicator may indicate a frequency resource that is a first frequency resource of a set of subchannels indicated by $L_{SubCH}$), or may include an offset from a sidelink resource 305 in which the coordination message 310 is located, or the like. For example, the first UE may encode, in the FDRI field, N−1 values (e.g., $f_1, \ldots f_{n-1}$).

In some examples, the first UE may identify a threshold number of resources reserved per reservation (e.g., coordination message) N. A base station may configure the first UE with the threshold number of resources, or the threshold number of resources may be preconfigured (e.g., in default settings), included in one or more standards documents, or the like. In some examples, the threshold number or resources may be higher than conventional systems support (e.g., greater than 3). In some examples, the base station may not configure a threshold number of reserved resources. In such examples, the first UE may reserve any number of reserved sidelink resources 315. As illustrated with reference to FIG. 2, the UE may operate with N=2 (e.g., a two subsets of reserved sidelink resources 315, each with $L_{SubCH}$=2.

In some examples, the first UE may include, in the TDRI field, one or more time indicators T. For example, the first UE may encode, in the TDRI field, N−1 values values (e.g., $t_1, \ldots t_{n-1}$), where $t_1 \le t_i \le$the threshold amount of time. Each Time indicator T may indicate an offset between the sidelink resource 305 in which the coordination message 310 is received by the second UE, and the reserved sidelink resources 315. For example, the TDRI may include a first time indicator T1 for a first subset of reserved sidelink resources 315 (e.g., a single sidelink resources 315 or multiple sidelink resources 315) and a second time indicator T2 for a second subset of reserved sidelink resources 315 (e.g., a single sidelink resources 315 or multiple sidelink resources 315). In some examples, the base station may configure the UE with a threshold amount of time, such as a threshold number of time units (e.g., slots) between the sidelink resource 305 in which the coordination message 310 is located and the reserved sidelink resources 315 (e.g., a threshold value for T1). In some examples, the first UE or the second UE or both may identify the threshold amount of time (e.g., a default or factory setting for the threshold amount of time). In such examples, the first UE may select sidelink resources 305 for reservation such that neither T1 nor T2 satisfy the threshold (e.g. exceed the threshold). In some examples, the threshold (e.g., and therefore T1 or T2 or both) may exceed a conventional threshold (e.g., may be greater than 31 time units). The threshold amount of time may be preconfigured or fixed, or included in one or more standards documents. Example values for the timing indicator values may include, for instance, 63, 127, 255, or the like.

As described with reference to FIG. 2, the coordination message 310 that indicates the reserved sidelink resources 315 may also indicate whether the reservation is for type A resources (e.g., a grant of resources for transmission by the second UE to the first UE or to one or more third UEs) or type B resources (e.g., self-reservation resources for a transmission by the first UE).

The first UE may transmit the coordination message 310, which may be received by at least the second UE. The coordination message may an SCI or SCI 2 message, a MAC-CE, an RRC message, or a data message. Upon receive the coordination message 310, the second UE may select one or more available sidelink resources 305 for sending a transmission. If the reserved sidelink resources 315 are type A resources, then the second UE may select one or more of the reserved sidelink resources 315 (e.g., for a sidelink transmission to the first UE, or one or more third UEs). If the reserved sidelink resources 315 are type B resources, then the second UE may avoid selecting any sidelink resources 305 that partially or completely overlap with reserved sidelink resources 315. As described herein, the reserved sidelink resources 315 may include a single resource or multiple resources.

Figure 4:
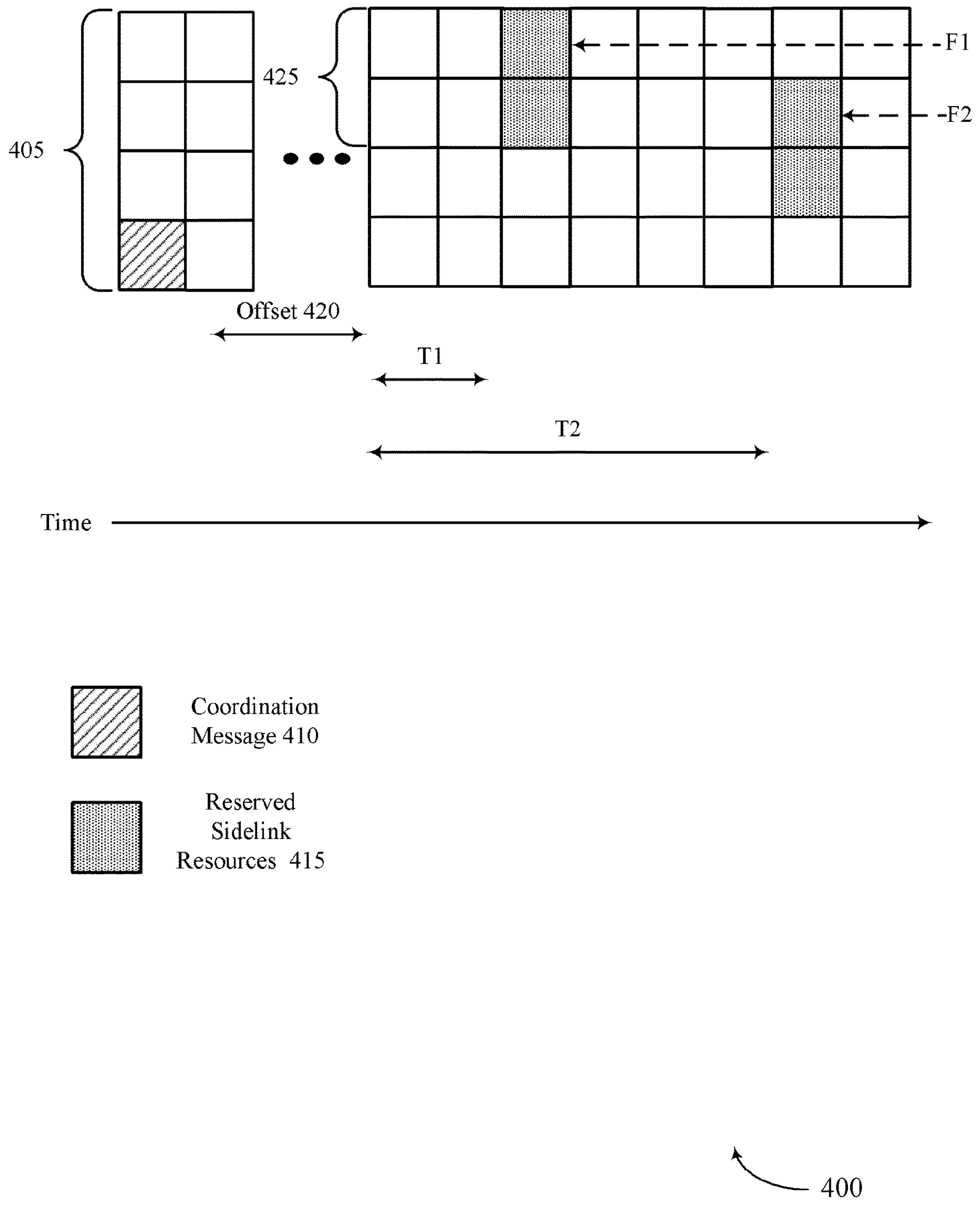
FIG. 4 illustrates an example of a timeline that supports unified signaling to support user equipment coordination for sidelink in accordance with aspects of the present disclosure.

FIG. 4 illustrates an example of a timeline 400 that supports unified signaling to support user equipment coordination for sidelink in accordance with aspects of the present disclosure. Timeline 400 may implement aspects wireless communications systems 100 and 200, or timeline 300. For example, one or more UEs may communicate according to timeline 400. Such UEs may be examples of corresponding devices (e.g., such as UEs 115) described with reference to FIGS. 1-3.

In some examples, as described in greater detail with reference to FIG. 2, various UEs may communicate with other UEs via sidelink resources 405. A first UE may select sidelink resources 405 for a transmission from a second UE to the first UE or to one or more third UEs, or may select sidelink resources 405 for transmissions from the first UE to the one or more third UEs. The first UE may transmit a coordination message 410 on sidelink resources 405 to the second UE. The coordination message 410 may include an FDRI field indicating frequency resources for the selected resources (e.g., reserved sidelink resources 415, and a TDRI field indicating time resources for the reserved sidelink resources 415. As described herein, the reserved sidelink resources 415 may refer to a single resource or multiple resources.

The coordination message may include a value for a number of subchannels in each subset of the reserved sidelink resources 415. For example, a first subset of reserved sidelink resources 415 (e.g., after T1) and a second subset of reserved sidelink resources 415 (e.g., after T2) may both span a set of subchannels 425 (e.g., as indicated in the coordination message via a parameter, such as $L_{SubCH}$). The FDRI field may include one or more frequency indicators (e.g., F1 and F2). The FDRI field may include one or more frequency indicators (e.g., F1 and F2). The FDRI field may include one or more frequency indicators (e.g., indicting a frequency resources that is a first frequency resource of a set of subchannels indicated by $L_{SubCH}$), or may include an offset from a sidelink resource 405 in which the coordination message 410 is located, or the like. For example, the first UE may encode, in the FDRI field, N−1 values (e.g., $f_1, \ldots f_{n-1}$).

In some examples, the first UE may identify a threshold number of resources reserved per reservation (e.g., coordination message) N. A base station may configure the first UE with the threshold number of resources, or the threshold number of resources may be preconfigured (e.g., in default settings), included in one or more standards documents, or the like. In some examples, the threshold number or resources may be higher than conventional systems support (e.g., greater than 3). In some examples, the base station may not configure a threshold number of reserved resources. In such examples, the first UE may reserve any number of reserved sidelink resources 415. As illustrated with reference to FIG. 2, the UE may operate with N=2 (e.g., a two subsets of reserved sidelink resources 415, each with $L_{SubCH}$=2.

In some examples, the first UE may include, in the TDRI field, one or more time indicators T. For example, the first UE may encode, in the TDRI field, N−1 values (e.g., $t_1, \ldots t_{n-1}$), where $t_1 \leq t_i \leq$ the threshold amount of time (e.g., 31 time units). Each Time indicator T may indicate an amount of time between an offset 420 and a subset of the reserved sidelink resources 415. For example, the UEs may be configured with a value for offset 420. Offset 420 may define an amount of time between the sidelink resource 405 in which the coordination message 410 is received, and a starting point from which to apply the time indicators T. That is, each subset of reserved sidelink resources 415 may be located, in the time domain, the sum of the offset 420 and a respective time indicator T. Thus, a first subset of reserved sidelink resources 415 may be located offset 420 plus T1 from the sidelink resource 405 in which the coordination message 410 is received. A second subset of reserved sidelink resources 415 may be located offset 420 plus T2 from the sidelink resource 405 in which the coordination message 410 is received.

The TDRI field in the coordination message may include a first time indicator T1 for the first subset of reserved sidelink resources 415 and a second time indicator T2 for a second subset of reserved sidelink resources 415. In some examples, the UE may identify a threshold amount of time, such as a threshold number of time units (e.g., slots) (e.g., a threshold value for T1). A base station may configure the first UE with the threshold amount of time, or the threshold amount of time may be preconfigured (e.g., in default settings), included in one or more standards documents, or the like. In such examples, the first UE may select sidelink resources 405 for reservation such that neither T1 nor T2 satisfy the threshold (e.g. exceed the threshold). In some examples, the threshold (e.g., and therefore T1 or T2 or both) may be equal to 31 time units. By applying the selected time indicators T (e.g., T1 and T2) to the offset 420, the reserved sidelink resources 415 may be located greater than the threshold amount of time away from the sidelink resource 405 in which the coordination message 410 is received. However, the subsets of reserved sidelink resources 415 may be no further apart from each other in the time domain than the threshold amount of time (e.g., because neither T1 nor T2 may exceed the threshold amount of time. The threshold amount of time may be preconfigured or fixed, or included in one or more standards documents. Example values for the timing indicator values may include any value between zero and 31. The value of offset 420 may be for example, 31, 63, 127, or the like. The threshold amount of time, or the offset 420, or both, may be preconfigured, configured by a base station or another UE, included in one or more standard, or the like. In some examples, the value of the offset 420 may be included in the coordination message 410.

As described with reference to FIG. 2, the coordination message 410 that indicates the reserved sidelink resources 415 may also indicate whether the reservation is for type A resources (e.g., a grant of resources for transmission by the second UE to the first UE or to one or more third UEs) or type B resources (e.g., self-reservation resources for a transmission by the first UE).

The first UE may transmit the coordination message 410, which may be received by at least the second UE. The coordination message may an SCI or SCI 2 message, a MAC-CE, an RRC message, or a data message. Upon receive the coordination message 410, the second UE may select one or more available sidelink resources 405 for sending a transmission. If the reserved sidelink resources 415 are type A resources, then the second UE may select one or more of the reserved sidelink resources 415 (e.g., for a sidelink transmission to the first UE, or one or more third UEs). If the reserved sidelink resources 415 are type B resources, then the second UE may avoid selecting any sidelink resources 405 that partially or completely overlap with reserved sidelink resources 415.

Figure 5:
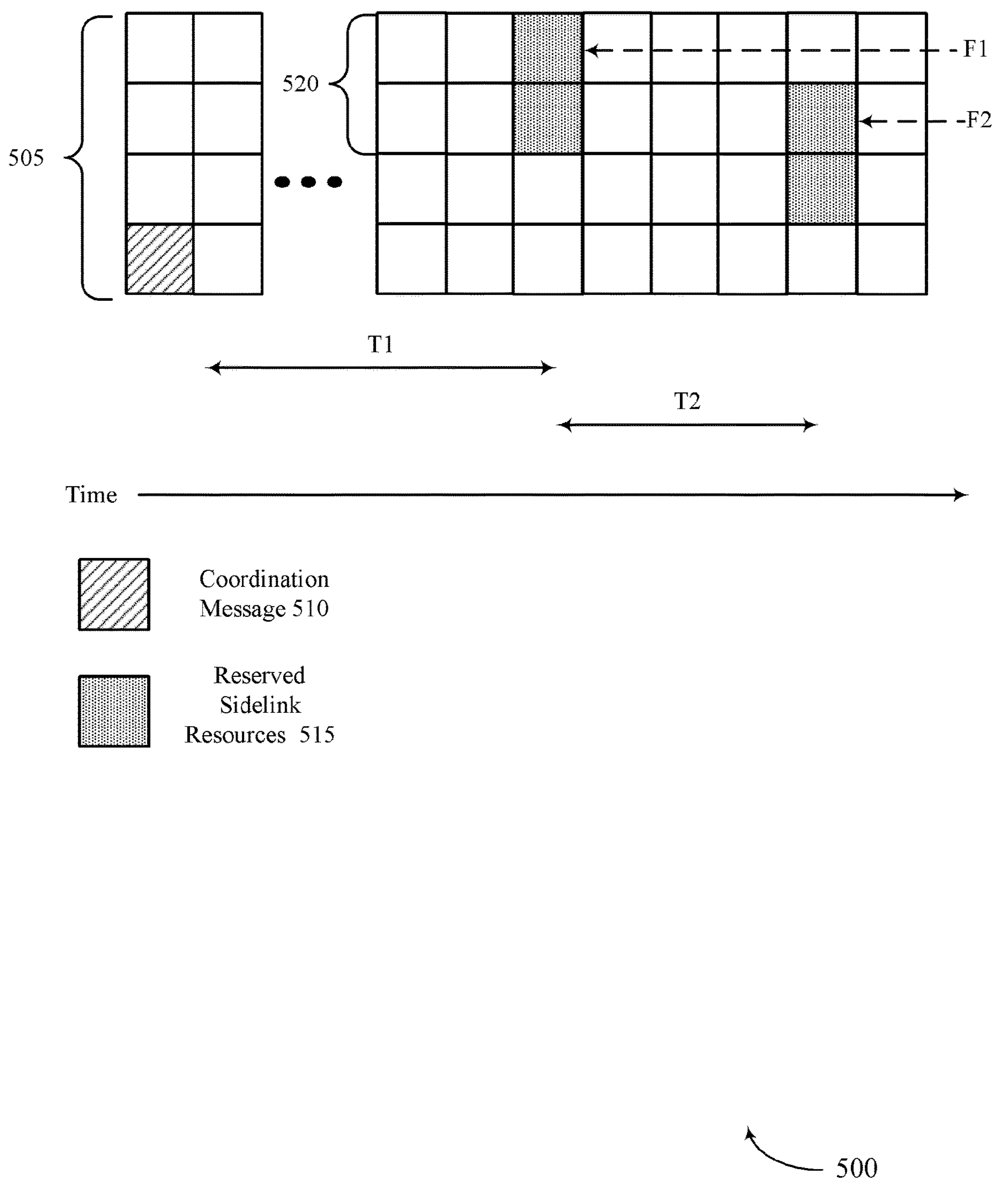
FIG. 5 illustrates an example of a timeline that supports unified signaling to support user equipment coordination for sidelink in accordance with aspects of the present disclosure.

FIG. 5 illustrates an example of a timeline 500 that supports unified signaling to support user equipment coordination for sidelink in accordance with aspects of the present disclosure. Timeline 300 may implement aspects wireless communications systems 100 and 200, and timelines 300 and 400. For example, one or more UEs may communicate according to timeline 500. Such UEs may be examples of corresponding devices (e.g., such as UEs 115) described with reference to FIGS. 1-4.

In some examples, as described in greater detail with reference to FIG. 2, various UEs may communicate with other UEs via sidelink resources 505. A first UE may select sidelink resources 505 for a transmission from a second UE to the first UE or to one or more third UEs, or may select sidelink resources 505 for transmissions from the first UE to the one or more third UEs. The first UE may transmit a coordination message 510 on sidelink resources 505 to the second UE. The coordination message 510 may include an FDRI field indicating frequency resources for the selected sidelink resources (e.g., reserved sidelink resources 515), and a TDRI field indicating time resources for the reserved sidelink resources 515.

The coordination message may include a value for a number of subchannels in each subset of the reserved sidelink resources 515. For example, a first subset of reserved sidelink resources 515 (e.g., after T1) and a second subset of reserved sidelink resources 515 (e.g., after T2) may both span a set of subchannels 520 (e.g., as indicated in the coordination message via a parameter, such as $L_{SubCH}$). The FDRI field may include one or more frequency indicators (e.g., F1 and F2). The FDRI field may include one or more frequency indicators (e.g., indicting a frequency resources that is a first frequency resource of a set of subchannels indicated by $L_{SubCH}$), or may include an offset from a sidelink resource 505 in which the coordination message 510 is located, or the like. For example, the first UE may encode, in the FDRI field, N−1 values (e.g., $f_1, \ldots f_{n-1}$).

In some examples, the first UE may identify a threshold number of resources reserved per reservation (e.g., coordination message) N. A base station may configure the first UE with the threshold number of resources, or the threshold number of resources may be preconfigured (e.g., in default settings), included in one or more standards documents, or the like. In some examples, the threshold number or resources may be higher than conventional systems support (e.g., greater than 3). In some examples, the base station may not configure a threshold number of reserved resources. In such examples, the first UE may reserve any number of reserved sidelink resources 515 (e.g., a single sidelink resource or multiple sidelink resources). As illustrated with reference to FIG. 2, the UE may operate with N=2 (e.g., two subsets of reserved sidelink resources 515, each with $L_{SubCH}$=2.

In some examples, the first UE may include, in the TDRI field, one or more time indicators T. For example, the first UE may encode, in the TDRI field, N−1 values (e.g., $t_1, \ldots t_{n-1}$), where $t_1 \leq t_i \leq$ the threshold amount of time (e.g., 31 time unites). Each time indicator T may indicate an offset between a reference point and a next subset of reserved sidelink resources 515. For example, the time indicators T may be applied to each other (e.g., instead of to a common reference point). For instance, the first time indicator T1 may indicate an amount of time between the sidelink resource 505 in which the coordinating message 510 is received, and a first subset of reserved sidelink resources 515. The second time indicator T2 may indicate an amount of time between expiration of the first time indicator T1 (e.g., the time resource in which the first subset of sidelink resources 515 are scheduled) and the second subset of reserved sidelink resources 515.

In some examples, the base station may configure the UE with a threshold amount of time, such as a threshold number of time units (e.g., slots) (e.g., a threshold value for T1). However, by applying the time indicators T to each other (e.g., to different reference points instead of a common reference point), the first UE may reserve sidelink resources further away in time from the coordination message 510 than the threshold amount of time. Because of the threshold amount of time constraint on the size of the values for time indicators T, the subsets of reserved sidelink resources 515 may not be further apart from each other in time than the threshold amount of time. however, all subsets of reserved sidelink resources 515 subsequent to the first subset of reserved sidelink resources 515 may be located further away from the coordination message 510 than the threshold amount of time (e.g., as a result of changing how each time indicator T is interpreted and applied by the second UE).

As described with reference to FIG. 2, the coordination message 510 that indicates the reserved sidelink resources 515 may also indicate whether the reservation is for type A resources (e.g., a grant of resources for transmission by the second UE to the first UE or to one or more third UEs) or type B resources (e.g., self-reservation resources for a transmission by the first UE).

The first UE may transmit the coordination message 510, which may be received by at least the second UE. The coordination message may an SCI or SCI 2 message, a MAC-CE, an RRC message, or a data message. Upon receive the coordination message 510, the second UE may select one or more available sidelink resources 505 for sending a transmission. If the reserved sidelink resources 515 are type A resources, then the second UE may select one or more of the reserved sidelink resources 515 (e.g., for a sidelink transmission to the first UE, or one or more third UEs). If the reserved sidelink resources 515 are type B resources, then the second UE may avoid selecting any sidelink resources 505 that partially or completely overlap with reserved sidelink resources 515.

Figure 6:
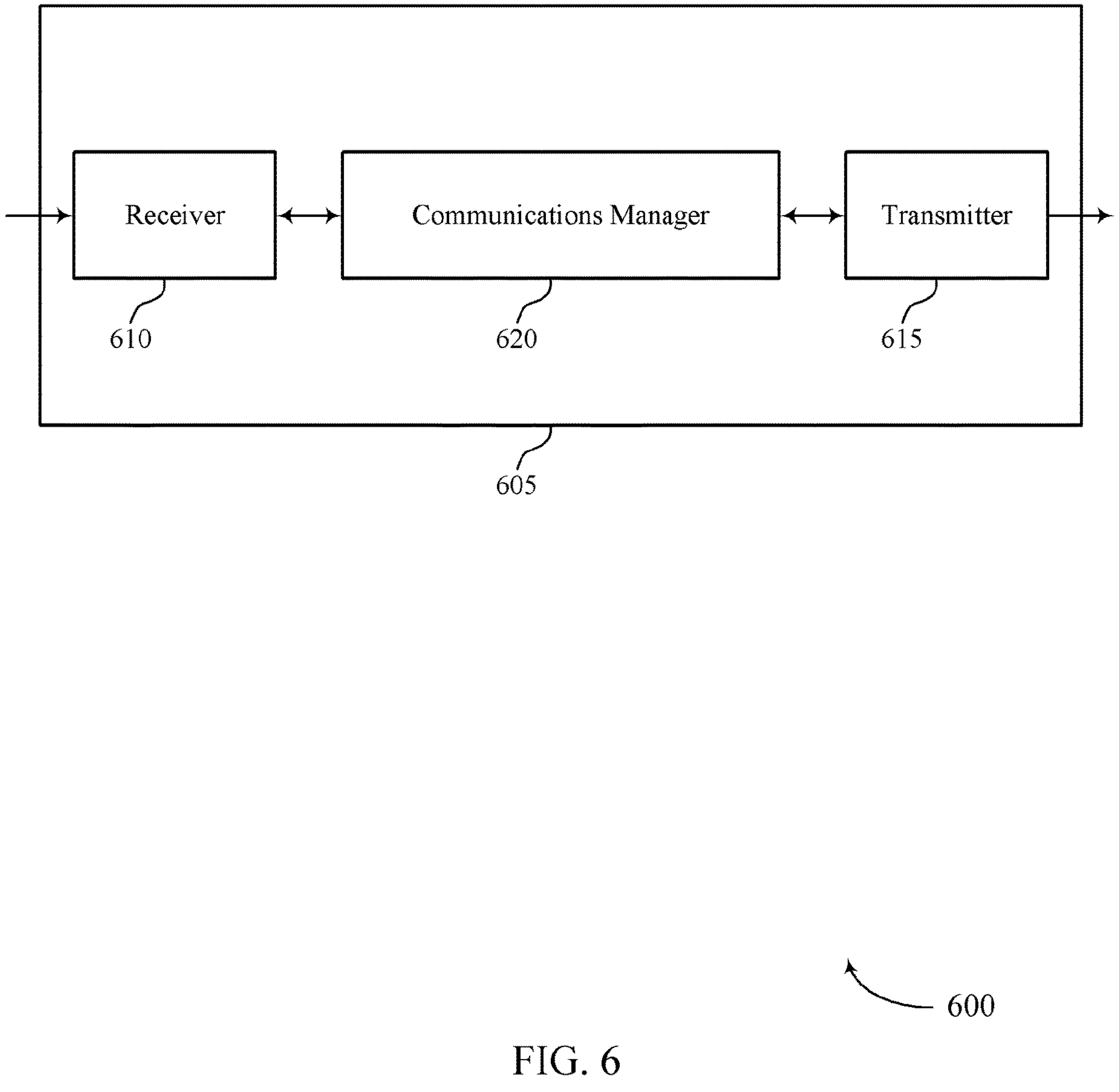
FIGS. 6 and 7 show block diagrams of devices that support unified signaling to support user equipment coordination for sidelink in accordance with aspects of the present disclosure.

FIG. 6 shows a block diagram 600 of a device 605 that supports unified signaling to support user equipment coordination for sidelink in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to unified signaling to support user equipment coordination for sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to unified signaling to support user equipment coordination for sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of unified signaling to support user equipment coordination for sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for identifying a set of time and frequency resources reserved by one or more second UEs for one of sidelink transmissions by a second UE to the first UE or to one or more third UEs, or sidelink transmissions by the first UE to one or more third UEs. The communications manager 620 may be configured as or otherwise support a means for selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The communications manager 620 may be configured as or otherwise support a means for transmitting, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to the one or more third UEs.

Additionally, or alternatively, the communications manager 620 may support wireless communications at a second UE in accordance with examples as disclosed herein. For example, the communications manager 620 may be configured as or otherwise support a means for receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs. The communications manager 620 may be configured as or otherwise support a means for determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs. The communications manager 620 may be configured as or otherwise support a means for selecting, based on the determined first set of time and frequency resources for the reservation, a second set of time and frequency resources for one or more data messages to be transmitted, wherein the first set of time and frequency resources do not overlap with the first set of time and frequency resources. The communications manager 620 may be configured as or otherwise support a means for transmitting the one or more data messages using at least a portion of the selected second set of time and frequency resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for inter-UE coordination, which may result in improved efficient use of resources, decreased interference and sidelink transmission collisions, improved system efficiency, decreased system latency, and improved user experience.

Figure 7:
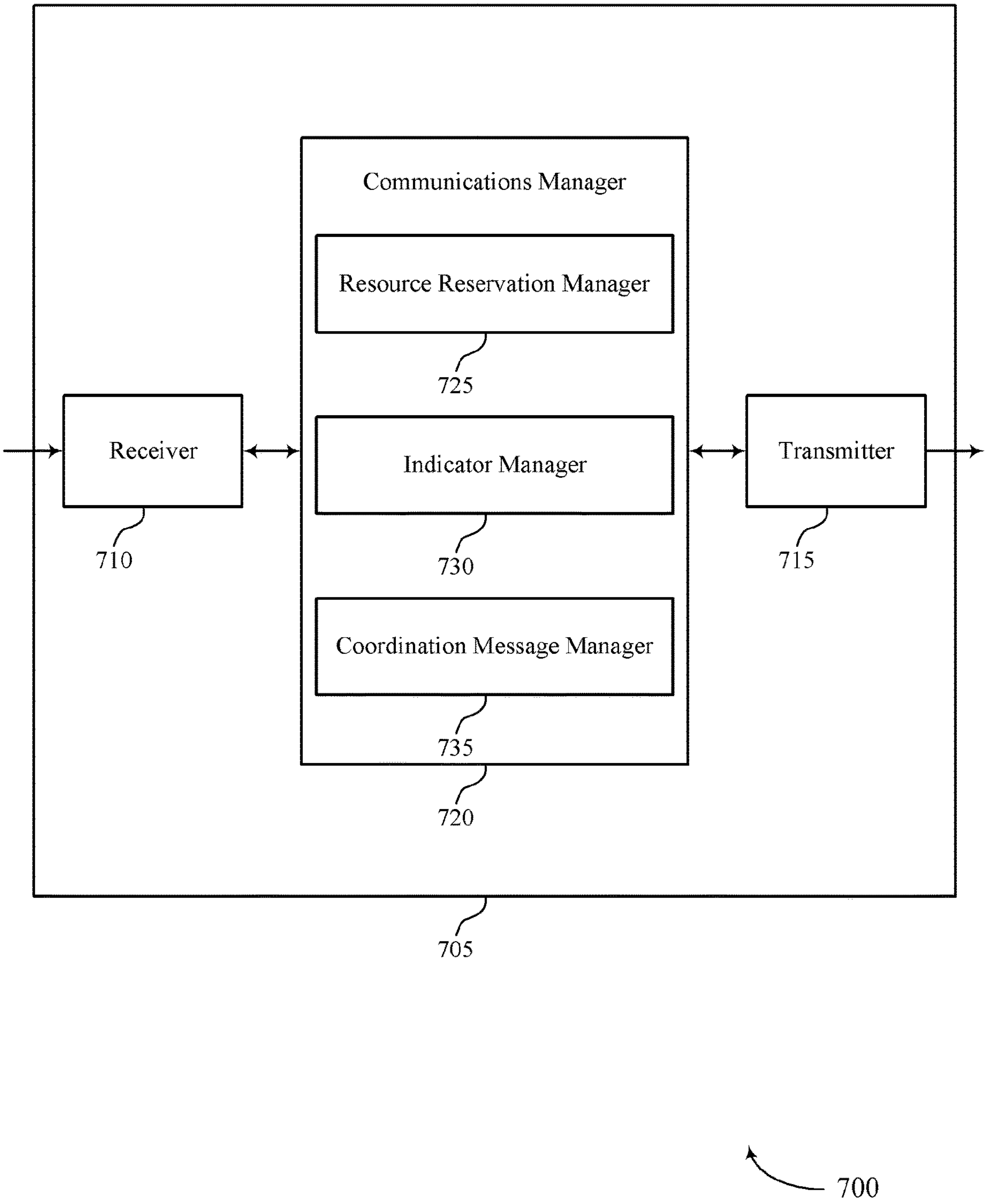

FIG. 7 shows a block diagram 700 of a device 705 that supports unified signaling to support user equipment coordination for sidelink in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to unified signaling to support user equipment coordination for sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to unified signaling to support user equipment coordination for sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of unified signaling to support user equipment coordination for sidelink as described herein. For example, the communications manager 720 may include a resource reservation manager 725, an indicator manager 730, a coordination message manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The resource reservation manager 725 may be configured as or otherwise support a means for identifying a set of time and frequency resources reserved by one or more second UEs for one of sidelink transmissions by a second UE to the first UE or to one or more third UEs, or sidelink transmissions by the first UE to one or more third UEs. The indicator manager 730 may be configured as or otherwise support a means for selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The coordination message manager 735 may be configured as or otherwise support a means for transmitting, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

Additionally, or alternatively, the communications manager 720 may support wireless communications at a second UE in accordance with examples as disclosed herein. The coordination message manager 735 may be configured as or otherwise support a means for receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs. The resource reservation manager 725 may be configured as or otherwise support a means for determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs. The resource reservation manager 725 may be configured as or otherwise support a means for selecting, based on the determined first set of time and frequency resources for the reservation, a second set of time and frequency resources for one or more data messages to be transmitted, wherein the first set of time and frequency resources do not overlap with the first set of time and frequency resources. The resource reservation manager 725 may be configured as or otherwise support a means for transmitting the one or more data messages using at least a portion of the selected second set of time and frequency resources.

Figure 8:
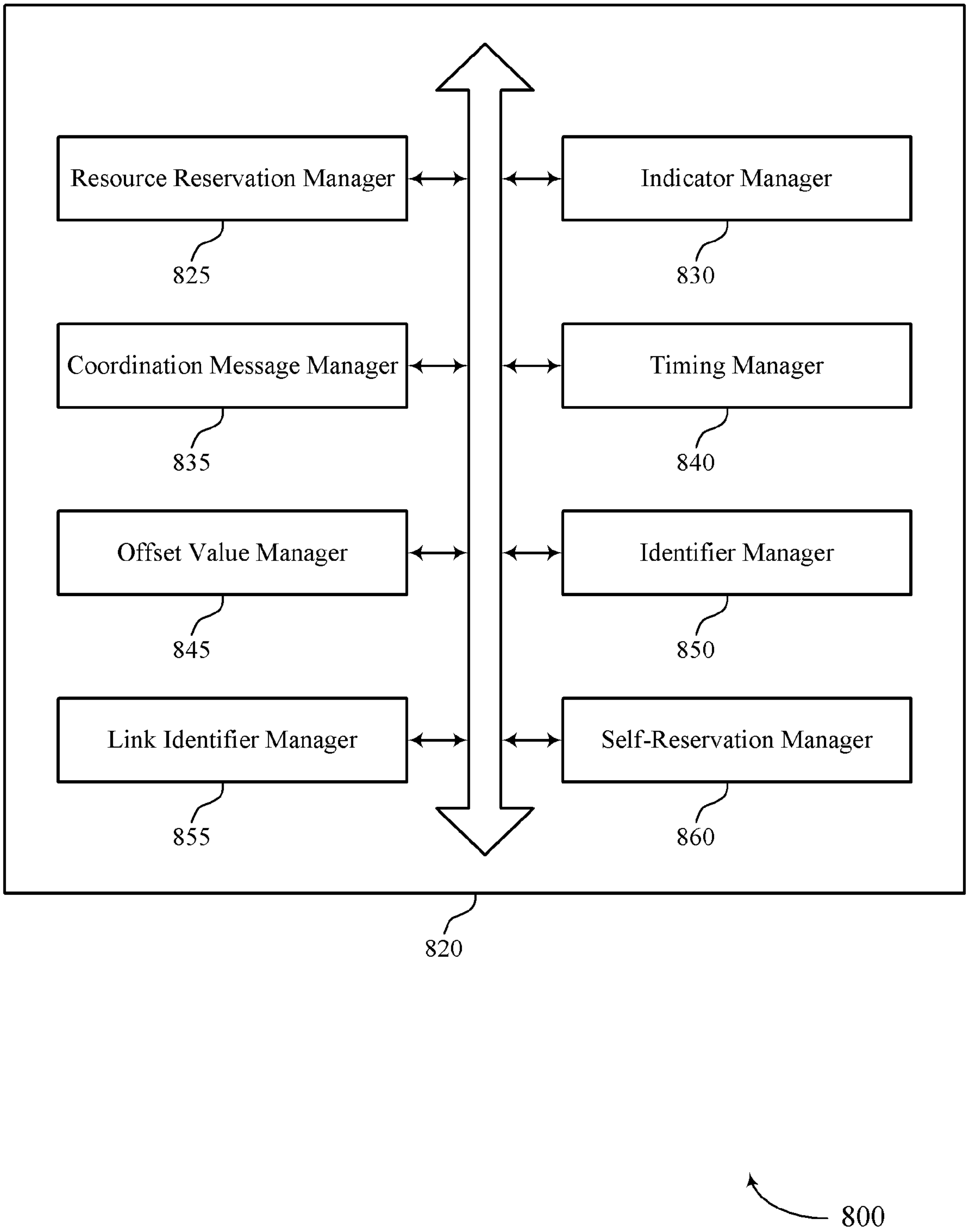
FIG. 8 shows a block diagram of a communications manager that supports unified signaling to support user equipment coordination for sidelink in accordance with aspects of the present disclosure.

FIG. 8 shows a block diagram 800 of a communications manager 820 that supports unified signaling to support user equipment coordination for sidelink in accordance with aspects of the present disclosure. The communications manager 820 may be an example of aspects of a communications manager 620, a communications manager 720, or both, as described herein. The communications manager 820, or various components thereof, may be an example of means for performing various aspects of unified signaling to support user equipment coordination for sidelink as described herein. For example, the communications manager 820 may include a resource reservation manager 825, an indicator manager 830, a coordination message manager 835, a timing manager 840, an offset value manager 845, an identifier manager 850, a link identifier manager 855, a self-reservation manager 860, or any combination thereof. Each of these components may communicate, directly or indirectly, with one another (e.g., via one or more buses).

The communications manager 820 may support wireless communications at a first UE in accordance with examples as disclosed herein. The resource reservation manager 825 may be configured as or otherwise support a means for identifying a set of time and frequency resources reserved by one or more second UEs for one of sidelink transmissions by a second UE to the first UE or to one or more third UEs, or sidelink transmissions by the first UE to one or more third UEs. The indicator manager 830 may be configured as or otherwise support a means for selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The coordination message manager 835 may be configured as or otherwise support a means for transmitting, to the one or more second UEs, a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs. The resource reservation manager 825 may be configured as or otherwise support a means for identifying an offset value for the time resource based at least in part on the reservation being for the one of the sidelink transmissions by the one or more second UEs to the first UE or to the one or more third UEs, or the sidelink transmissions by the first UE to the one or more third UEs, and selecting the first indicator for the reservation based at least in part on the offset value for the time resource.

In some examples, to support selecting the first indicator, the timing manager 840 may be configured as or otherwise support a means for determining that a time interval between the message and the time resource satisfies a threshold amount of time, where selecting the first indicator of the time resource is based on the time interval satisfying the threshold amount of time, and the threshold amount of time is associated with a message format usable for reservations for sidelink transmissions by the one or more second UEs to the first UE or to the one or more third UEs, and the sidelink transmissions by the first UE to the one or more third UEs.

In some examples, the timing manager 840 may be configured as or otherwise support a means for receiving control signaling including an indication of the threshold amount of time.

In some examples, to support selecting the first indicator, the offset value manager 845 may be configured as or otherwise support a means for identifying an offset value for the time resource based on the reservation being for the one of the sidelink transmissions by the one or more second UEs to the first UE or to the one or more third UEs, or the sidelink transmissions by the first UE to the one or more third UEs. In some examples, to support selecting the first indicator, the offset value manager 845 may be configured as or otherwise support a means for selecting the time indicator for the reservation based on the offset value for the time resource.

In some examples, the offset value manager 845 may be configured as or otherwise support a means for receiving, from a base station, the second UE, or the one or more third UEs, an indication of the offset value for the time resource.

In some examples, the identifier manager 850 may be configured as or otherwise support a means for generating the indication that the message is associated with the reservation for the sidelink transmissions by the one or more second UEs to the first UE or to the one or more third UEs, the indication including a source identifier for the first UE and a destination identifier for the second UE.

In some examples, the identifier manager 850 may be configured as or otherwise support a means for performing a negotiation procedure with the second UE to determine the source identifier and the destination identifier. In some examples, the identifier manager 850 may be configured as or otherwise support a means for selecting a device identifier for the second UE and transmitting a scheduling request to the first UE, the scheduling request comprising an indication of the device identifier for the second UE, wherein the device identifier for the second UE is received in the message for the reservation.

In some examples, the source identifier includes a device identifier for the first UE and the destination identifier includes a device identifier for the second UE.

In some examples, the link identifier manager 855 may be configured as or otherwise support a means for generating the indication that the message is associated with the reservation for the sidelink transmissions by the one or more second UEs to the first UE or to the one or more third UEs, the indication including a first link identifier for a sidelink between the first UE and the second UE.

In some examples, the first link identifier includes a device identifier for the second UE.

In some examples, the link identifier manager 855 may be configured as or otherwise support a means for performing a negotiation procedure with the second UE to determine the first link identifier for the sidelink. In some examples, the link identifier manager 855 may be configured as or otherwise support a means for selecting a link identifier for the second UE and transmitting a scheduling request to the first UE, the scheduling request comprising an indication of the link identifier, wherein the link identifier is received in the message for the reservation.

In some examples, the link identifier manager 855 may be configured as or otherwise support a means for monitoring the sidelink between the first UE and the second UE, one or more sidelinks between the first UE and the one or more third UEs, or any combination thereof. In some examples, the link identifier manager 855 may be configured as or otherwise support a means for identifying a second link identifier based on the monitoring. In some examples, the link identifier manager 855 may be configured as or otherwise support a means for selecting the first link identifier based on the first link identifier being different from the second link identifier.

In some examples, the self-reservation manager 860 may be configured as or otherwise support a means for generating the indication that the message is associated with the reservation for the sidelink transmissions by the first UE to the one or more third UEs, the indication including an identifier for the first UE.

In some examples, the identifier includes a device identifier for the first UE.

In some examples, the self-reservation manager 860 may be configured as or otherwise support a means for receiving, from the network, an indication of the identifier for the first UE.

Additionally, or alternatively, the communications manager 820 may support wireless communications at a second UE in accordance with examples as disclosed herein. In some examples, the coordination message manager 835 may be configured as or otherwise support a means for receiving, from a first UE, a message for a reservation that includes a first indicator of a time resource and a second indicator of a frequency resource, and that includes an indication that the message is associated with a reservation for one of sidelink transmissions the one or more second UEs to the first UE or to the one or more third UEs, or sidelink transmissions by the first UE to one or more third UEs. In some examples, the resource reservation manager 825 may be configured as or otherwise support a means for determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs. In some examples, the resource reservation manager 825 may be configured as or otherwise support a means for selecting, based on the determined first set of time and frequency resources for the reservation, a second set of time and frequency resources for one or more data messages to be transmitted, wherein the first set of time and frequency resources do not overlap with the first set of time and frequency resources. In some examples, the resource reservation manager 825 may be configured as or otherwise support a means for transmitting the one or more data messages to the first UE using at least a portion of the selected second set of time and frequency resources. In some examples, the resource reservation manager 825 may be configured as or otherwise support a means for applying an offset value to the first indicator of the time resource to determine a time interval between the message and the time resource of the first set of time and frequency resources.

In some examples, to support determining the first set of time and frequency resources, the timing manager 840 may be configured as or otherwise support a means for identifying a threshold amount of time for the first indicator of the time resource, the threshold amount of time associated with a message format usable for reservations for sidelink transmissions to the first UE or to the one or more third UEs, and the sidelink transmissions by the first UE to the one or more third UEs. In some examples, to support determining the first set of time and frequency resources, the offset value manager 845 may be configured as or otherwise support a means for applying an offset value to the first indicator of the time resource to determine a time interval between the message and the time resource of the first set of time and frequency resources.

In some examples, the offset value manager 845 may be configured as or otherwise support a means for receiving an indication of the threshold amount of time, the offset value, or both, where applying the offset value is based on the indication of the threshold amount of time.

In some examples, the timing manager 840 may be configured as or otherwise support a means for adding the first indicator of the time resource to a second indicator of a third time resource to determine the second time resource of a second set of time and frequency resources based on the reservation being for one of the sidelink transmissions by the one or more second UEs to the first UE or to the one or more third UEs, or the sidelink transmissions by the first UE to the one or more third UEs.

In some examples, to support receiving the message, the identifier manager 850 may be configured as or otherwise support a means for receiving the indication that the message is associated with the reservation for the sidelink transmissions to the first UE or to the one or more third UEs, the indication including a source identifier for the first UE and a destination identifier for the second UE.

In some examples, the identifier manager 850 may be configured as or otherwise support a means for performing a negotiation procedure with the first UE to determine the source identifier and the destination identifier. In some examples, the identifier manager 850 may be configured as or otherwise support a means for selecting a device identifier for the second UE and transmitting a scheduling request to the first UE, the scheduling request comprising an indication of the device identifier for the second UE, wherein the device identifier for the second UE is received in the message for the reservation.

In some examples, the source identifier includes a device identifier for the first UE and the destination identifier includes a device identifier for the second UE.

In some examples, to support receiving the message, the link identifier manager 855 may be configured as or otherwise support a means for receiving the indication that the message is associated with the reservation for the sidelink transmissions to the first UE or to the one or more third UEs, the indication including a first link identifier for a sidelink between the first UE and the second UE.

In some examples, the first link identifier includes a device identifier for the second UE.

In some examples, the link identifier manager 855 may be configured as or otherwise support a means for performing a negotiation procedure with the first UE to determine the first link identifier for the sidelink. In some examples, the link identifier manager 850 may be configured as or otherwise support a means for selecting a link identifier for the second UE and transmitting a scheduling request to the first UE, the scheduling request comprising an indication of the link identifier for the second UE, wherein the link identifier for the second UE is received in the message for the reservation.

In some examples, to support receiving the message, the self-reservation manager 860 may be configured as or otherwise support a means for receiving the indication that the message is associated with the reservation for sidelink transmissions by the first UE to the one or more third UEs, the indication including an identifier for the first UE.

In some examples, the identifier includes a device identifier for the first UE.

In some examples, the self-reservation manager 860 may be configured as or otherwise support a means for receiving, from the network, an indication of the identifier for the first UE.

Figure 9:
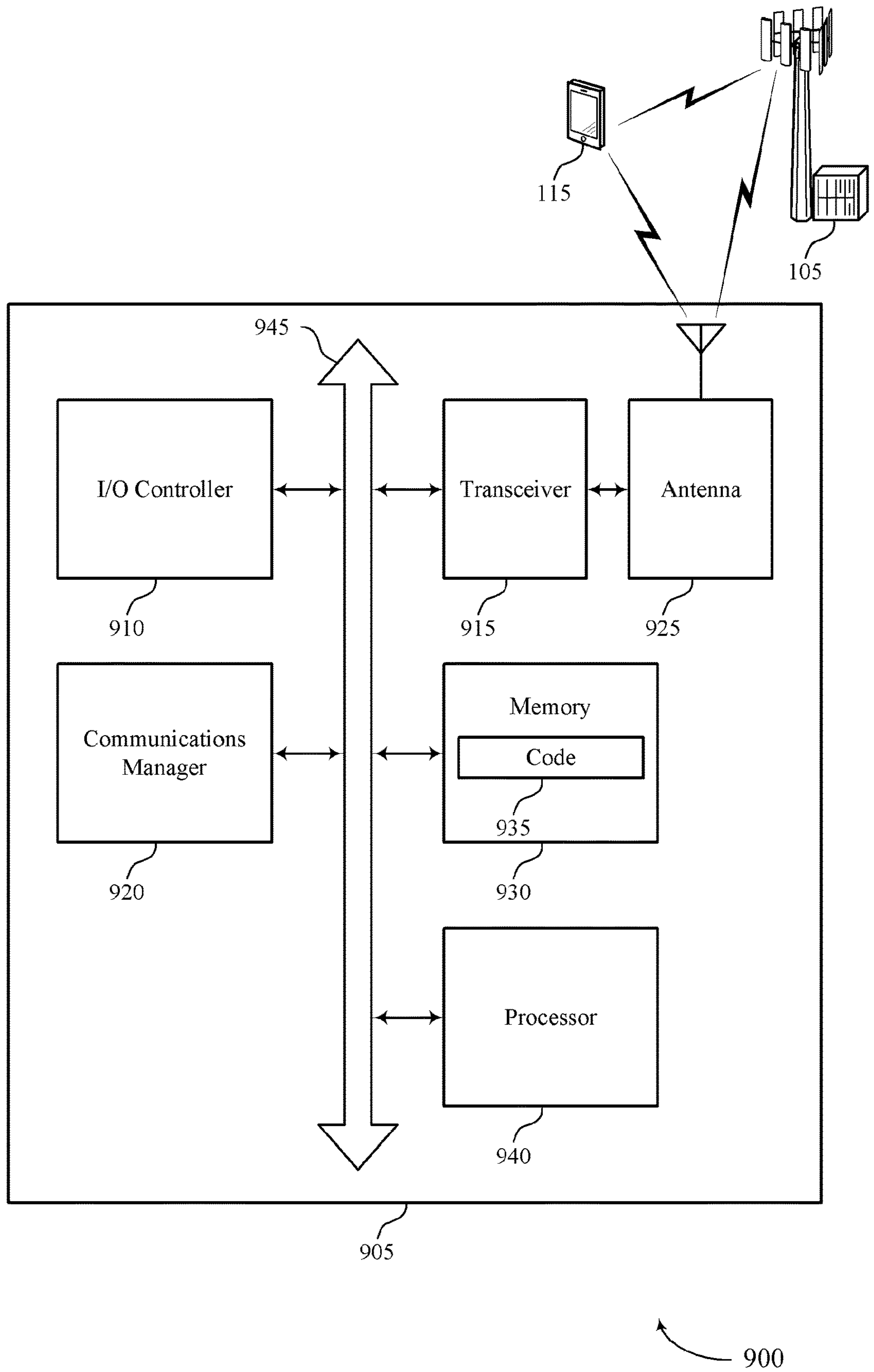
FIG. 9 shows a diagram of a system including a device that supports unified signaling to support user equipment coordination for sidelink in accordance with aspects of the present disclosure.

FIG. 9 shows a diagram of a system 900 including a device 905 that supports unified signaling to support user equipment coordination for sidelink in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting unified signaling to support user equipment coordination for sidelink). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for identifying a set of time and frequency resources reserved by one or more second UEs for one of sidelink transmissions by a second UE to the first UE or to one or more third UEs, or sidelink transmissions by the first UE to one or more third UEs. The communications manager 920 may be configured as or otherwise support a means for selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The communications manager 920 may be configured as or otherwise support a means for transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

Additionally, or alternatively, the communications manager 920 may support wireless communications at a second UE in accordance with examples as disclosed herein. For example, the communications manager 920 may be configured as or otherwise support a means for receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs. The communications manager 920 may be configured as or otherwise support a means for determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs. The communications manager 920 may be configured as or otherwise support a means for selecting, based on the determined first set of time and frequency resources for the reservation, a second set of time and frequency resources for one or more data messages to be transmitted, wherein the first set of time and frequency resources do not overlap with the first set of time and frequency resources. The communications manager 920 may be configured as or otherwise support a means for transmitting the one or more data messages to the first UE using at least a portion of the selected second set of time and frequency resources.

By including or configuring the communications manager 920 in accordance with examples as described herein, the device 905 may support techniques for inter-UE coordination, which may result in improved efficient use of resources, decreased interference and sidelink transmission collisions, improved system efficiency, decreased system latency, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of unified signaling to support user equipment coordination for sidelink as described herein, or the processor 940 and the memory 930 may be otherwise configured to perform or support such operations.

Figure 10:
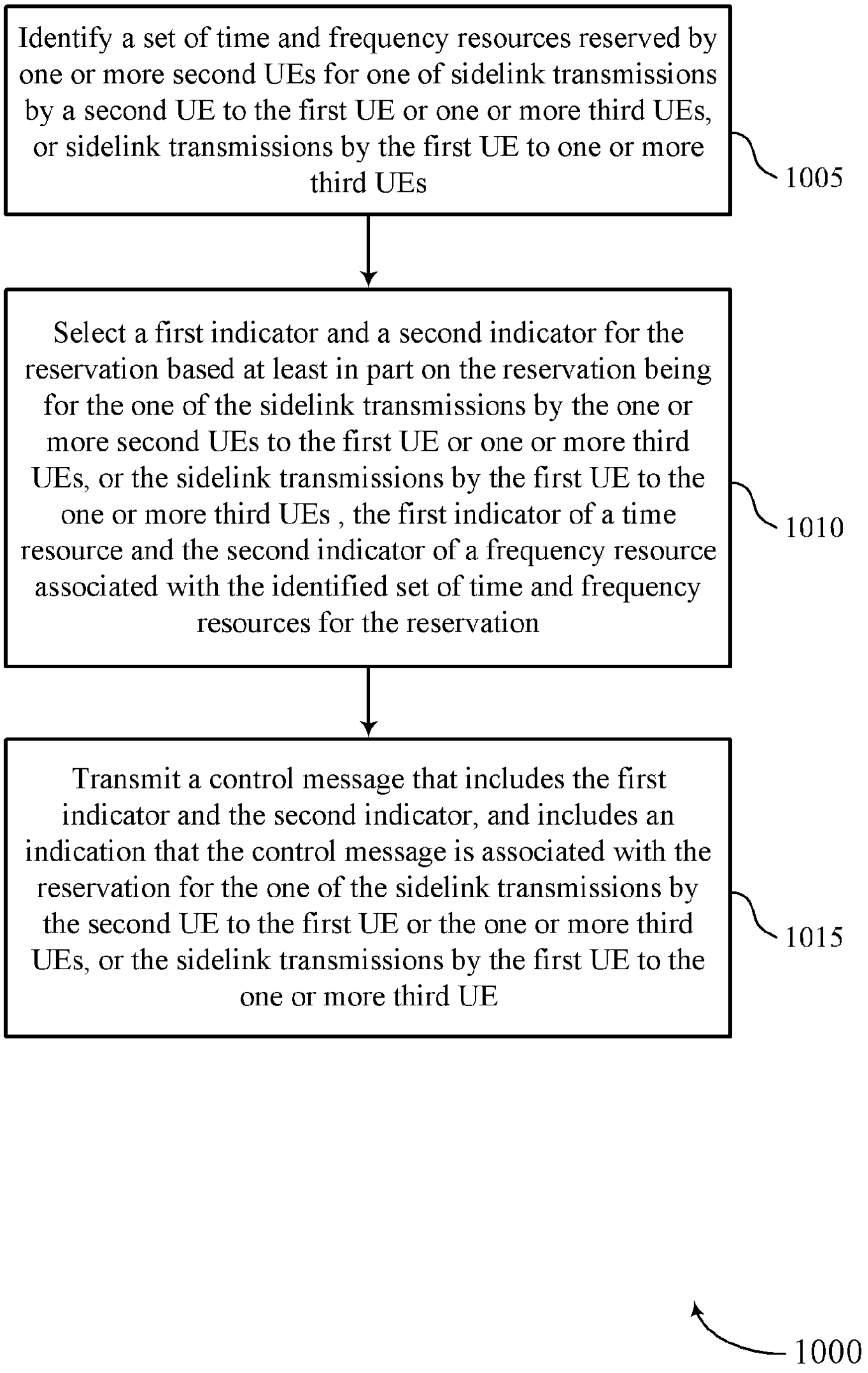
FIGS. 10 through 13 show flowcharts illustrating methods that support unified signaling to support user equipment coordination for sidelink in accordance with aspects of the present disclosure.

FIG. 10 shows a flowchart illustrating a method 1000 that supports unified signaling to support user equipment coordination for sidelink in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include identifying a set of time and frequency resources reserved by one or more second UEs for one of sidelink transmissions by the one or more second UEs to the first UE or to one or more third UEs, or sidelink transmissions by the first UE to one or more third UEs. The operations of 1005 may be performed in accordance with examples as disclosed herein. In some examples, aspects of the operations of 1005 may be performed by a resource reservation manager 825 as described with reference to FIG. 8.

At 1010, the method may include selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The operations of 1010 may be performed in accordance with examples as disclosed herein. In some examples, aspects of the operations of 1010 may be performed by an indicator manager 830 as described with reference to FIG. 8.

At 1015, the method may include transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs. The operations of 1015 may be performed in accordance with examples as disclosed herein. In some examples, aspects of the operations of 1015 may be performed by a coordination message manager 835 as described with reference to FIG. 8.

Figure 11:
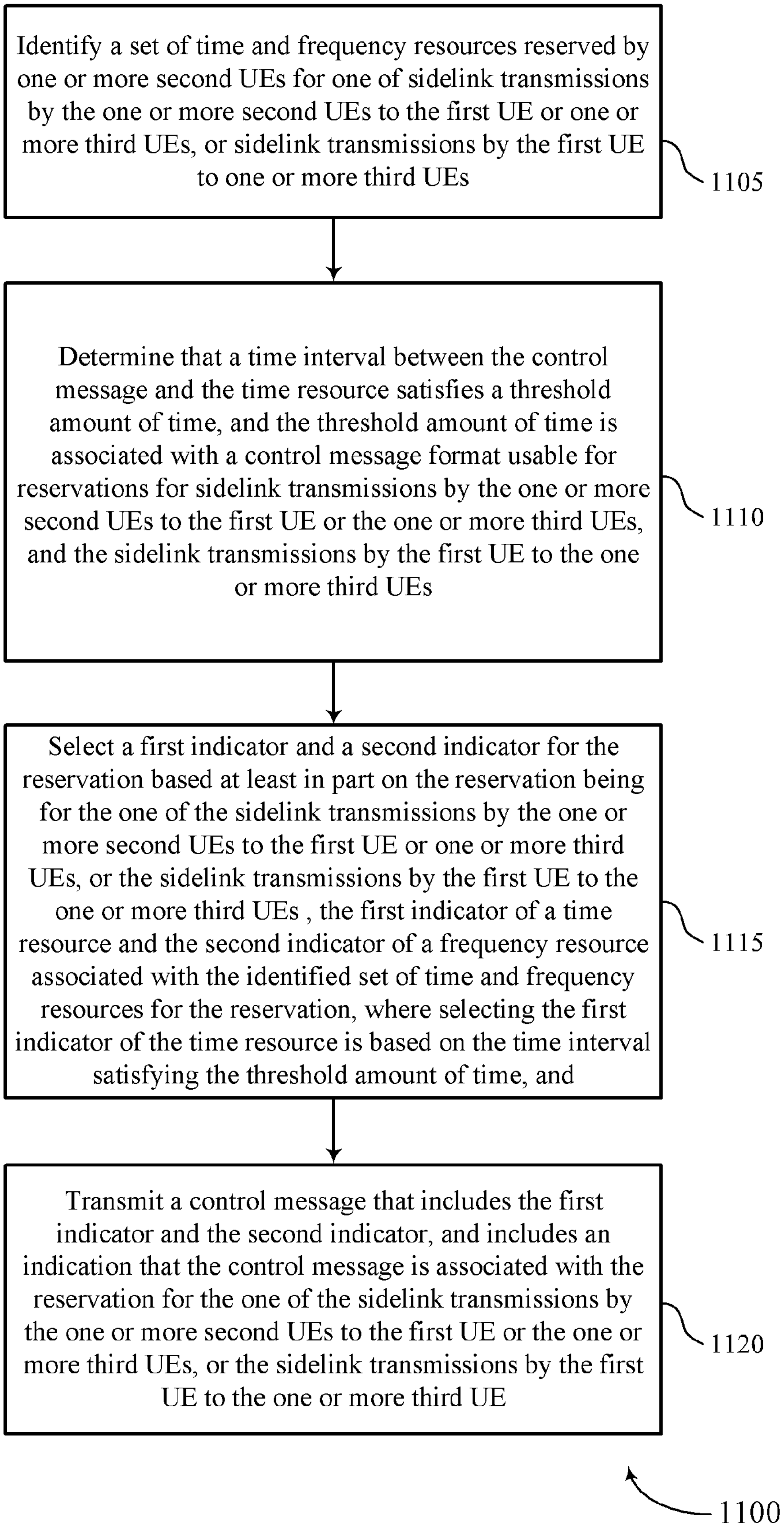

FIG. 11 shows a flowchart illustrating a method 1100 that supports unified signaling to support user equipment coordination for sidelink in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include identifying a set of time and frequency resources reserved by one or more second UEs for one of sidelink transmissions by the one or more second UEs to the first UE or to one or more third UEs, or sidelink transmissions by the first UE to one or more third UEs. The operations of 1105 may be performed in accordance with examples as disclosed herein. In some examples, aspects of the operations of 1105 may be performed by a resource reservation manager 825 as described with reference to FIG. 8.

At 1110, the method may include determining that a time interval between the message and the time resource satisfies a threshold amount of time, where the threshold amount of time is associated with a message format usable for reservations for sidelink transmissions by the one or more second UEs to the first UE or to the one or more third UEs, and the sidelink transmissions by the first UE to the one or more third UEs. The operations of 1110 may be performed in accordance with examples as disclosed herein. In some examples, aspects of the operations of 1110 may be performed by a timing manager 840 as described with reference to FIG. 8.

At 1115, the method may include selecting a first indicator and a second indicator for the reservation based on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation, where selecting the first indicator of the time resource is based on the time interval satisfying the threshold amount of time. The operations of 1115 may be performed in accordance with examples as disclosed herein. In some examples, aspects of the operations of 1115 may be performed by an indicator manager 830 as described with reference to FIG. 8.

At 1120, the method may include transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs. The operations of 1120 may be performed in accordance with examples as disclosed herein. In some examples, aspects of the operations of 1120 may be performed by a coordination message manager 835 as described with reference to FIG. 8.

Figure 12:
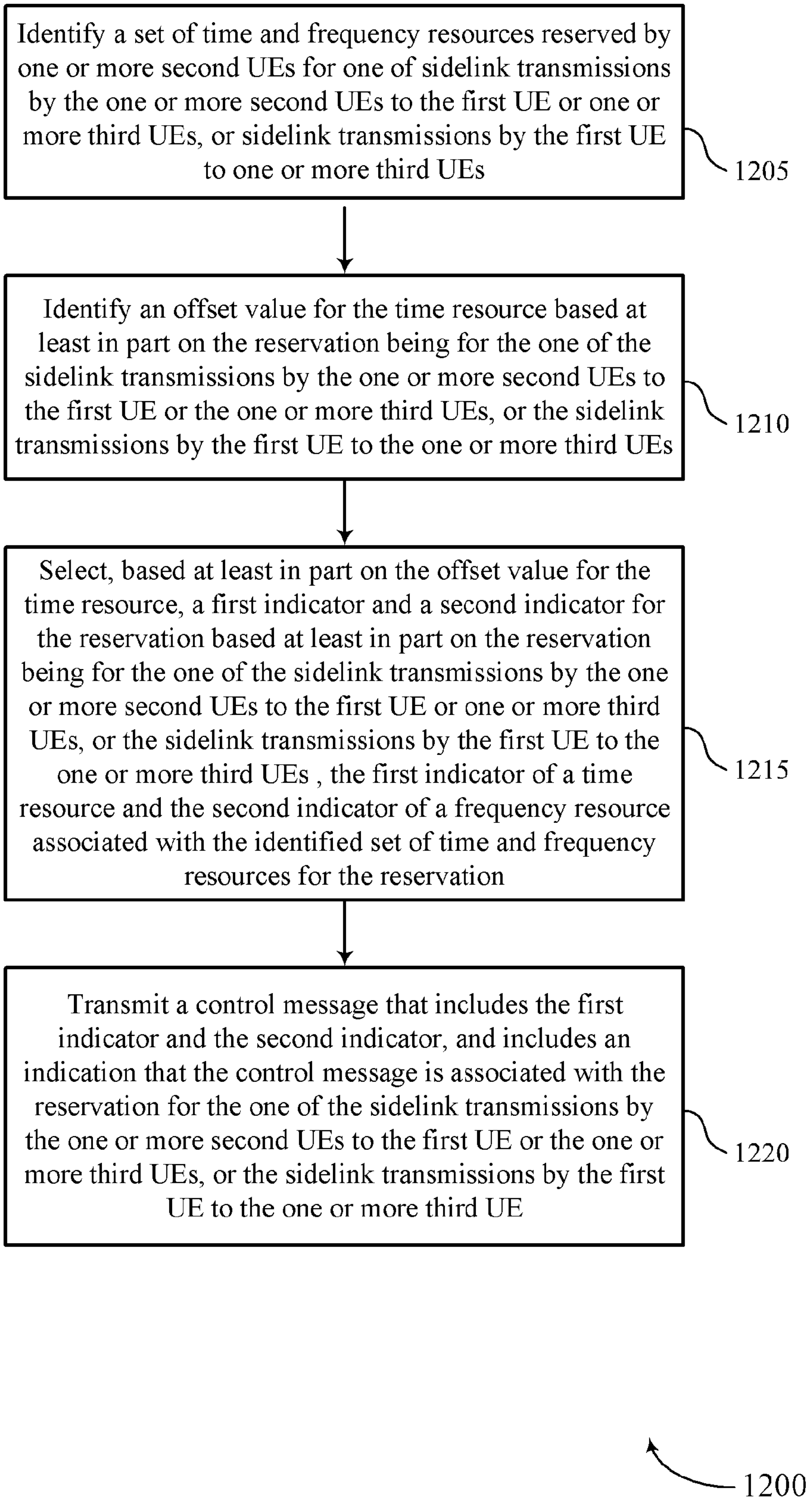

FIG. 12 shows a flowchart illustrating a method 1200 that supports unified signaling to support user equipment coordination for sidelink in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include identifying a set of time and frequency resources reserved by one or more second UEs for one of sidelink transmissions by one or more second UEs to the first UE or to one or more third UEs, or sidelink transmissions by the first UE to one or more third UEs. The operations of 1205 may be performed in accordance with examples as disclosed herein. In some examples, aspects of the operations of 1205 may be performed by a resource reservation manager 825 as described with reference to FIG. 8.

At 1210, the method may include identifying an offset value for the time resource based on the reservation being for the one of the sidelink transmissions by one or more second UEs to the first UE or to the one or more third UEs, or the sidelink transmissions by the first UE to the one or more third UEs. The operations of 1210 may be performed in accordance with examples as disclosed herein. In some examples, aspects of the operations of 1210 may be performed by an offset value manager 845 as described with reference to FIG. 8.

At 1215, the method may include selecting, based at least in part on the offset value for the time resource, a first indicator and a second indicator for the reservation based on the reservation being for the one of the sidelink transmissions by one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation. The operations of 1215 may be performed in accordance with examples as disclosed herein. In some examples, aspects of the operations of 1215 may be performed by an indicator manager 830 as described with reference to FIG. 8.

At 1220, the method may include transmitting a message that includes the first indicator and the second indicator, and includes an indication that the message is associated with the reservation for the one of the sidelink transmissions by one or more second UEs to the first UE or to the one or more third UEs, or the sidelink transmissions by the first UE to one or more third UEs. The operations of 1220 may be performed in accordance with examples as disclosed herein. In some examples, aspects of the operations of 1220 may be performed by a coordination message manager 835 as described with reference to FIG. 8.

Figure 13:
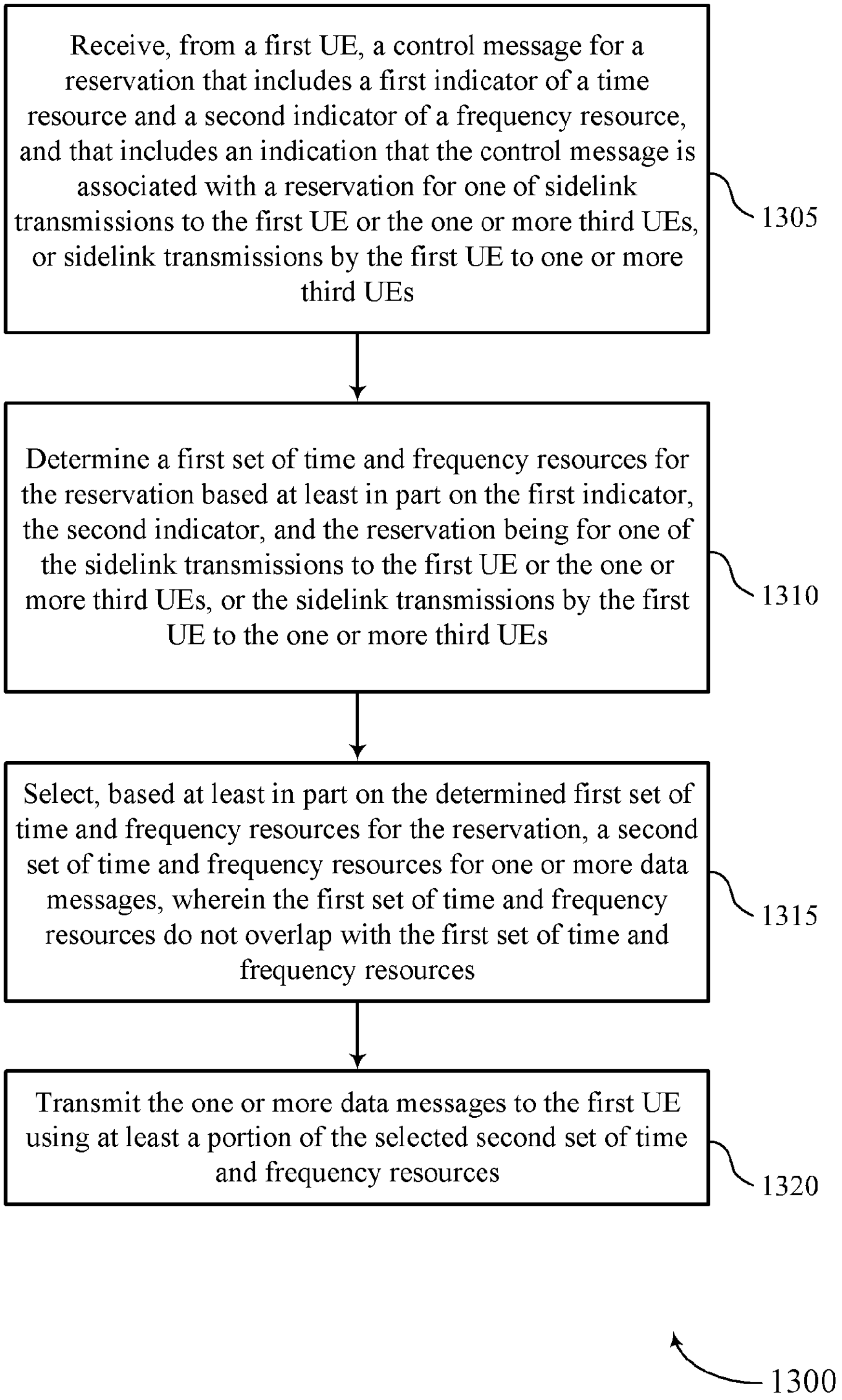

FIG. 13 shows a flowchart illustrating a method 1300 that supports unified signaling to support user equipment coordination for sidelink in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs. The operations of 1305 may be performed in accordance with examples as disclosed herein. In some examples, aspects of the operations of 1305 may be performed by a coordination message manager 835 as described with reference to FIG. 8.

At 1310, the method may include determining a first set of time and frequency resources for the reservation based on the first indicator, the second indicator, and the reservation being for one of the sidelink transmissions to the first UE or to the one or more third UEs, or the sidelink transmissions by the first UE to the one or more third UEs. The operations of 1310 may be performed in accordance with examples as disclosed herein. In some examples, aspects of the operations of 1310 may be performed by a resource reservation manager 825 as described with reference to FIG. 8.

At 1315, the method may include selecting, based on the determined first set of time and frequency resources for the reservation, a second set of time and frequency resources for one or more data messages, wherein the first set of time and frequency resources do not overlap with the first set of time and frequency resources. The operations of 1315 may be performed in accordance with examples as disclosed herein. In some examples, aspects of the operations of 1315 may be performed by a resource reservation manager 825 as described with reference to FIG. 8.

At 1320, the method may include transmitting the one or more data messages to the first UE using at least a portion of the selected second set of time and frequency resources. The operations of 1320 may be performed in accordance with examples as disclosed herein. In some examples, aspects of the operations of 1320 may be performed by a resource reservation manager 825 as described with reference to FIG. 8.

The following provides an overview of aspects of the present disclosure:

Aspect 1: A method for wireless communications at a first UE, comprising: identifying a set of time and frequency resources reserved by one or more second UEs for one of sidelink transmissions by the one or more second UEs to the first UE or to one or more third UEs, or sidelink transmissions by the first UE to one or more third UEs; selecting a first indicator and a second indicator for the reservation based at least in part on the reservation being for the one of the sidelink transmissions by the one or more second UEs to the first UE or to one or more third UEs, or the sidelink transmissions by the first UE to the one or more third UEs, the first indicator of a time resource and the second indicator of a frequency resource associated with the identified set of time and frequency resources for the reservation; and transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to one or more third UEs.

Aspect 2: The method of aspect 1, wherein selecting the first indicator comprises: determining that a time interval between the message and the time resource satisfies a threshold amount of time, wherein selecting the first indicator of the time resource is based at least in part on the time interval satisfying the threshold amount of time, and the threshold amount of time is associated with a message format usable for reservations for the sidelink transmissions by the one or more second UEs to the first UE or to the one or more third UEs, and the sidelink transmissions by the first UE to the one or more third UEs.

Aspect 3: The method of aspect 2, further comprising: receiving control signaling comprising an indication of the threshold amount of time.

Aspect 4: The method of any of aspects 1 through 3, wherein selecting the first indicator comprises: identifying an offset value for the time resource based at least in part on the reservation being for the one of the sidelink transmissions by the one or more second UEs to the first UE or to the one or more third UEs, or the sidelink transmissions by the first UE to the one or more third UEs; and selecting the first indicator for the reservation based at least in part on the offset value for the time resource.

Aspect 5: The method of aspect 4, further comprising: receiving, from a base station, the one or more second UEs, or the one or more third UEs, an indication of the offset value for the time resource.

Aspect 6: The method of any of aspects 1 through 5, further comprising: generating the indication that the message is associated with the reservation for the sidelink transmissions by the one or more second UEs to the first UE or to the one or more third UEs, the indication comprising a source identifier for the first UE and a destination identifier for the one or more second UEs.

Aspect 7: The method of aspect 6, further comprising: performing a negotiation procedure with the one or more second UEs to determine the source identifier and the destination identifier.

Aspect 8: The method of any of aspects 6 through 7, wherein the source identifier comprises a device identifier for the first UE and the destination identifier comprises a device identifier for the one or more second UEs.

Aspect 9: The method of any of aspects 1 through 8, further comprising: generating the indication that the message is associated with the reservation for the sidelink transmissions by the one or more second UEs to the first UE or to the one or more third UEs, the indication comprising a first link identifier for a sidelink between the first UE and the one or more second UEs.

Aspect 10: The method of aspect 9, wherein the first link identifier comprises a device identifier for the one or more second UEs.

Aspect 11: The method of any of aspects 9 through 10, further comprising: performing a negotiation procedure with the one or more second UEs to determine the first link identifier for the sidelink.

Aspect 12: The method of any of aspects 9 through 11, further comprising: monitoring the sidelink between the first UE and the one or more second UEs, one or more sidelinks between the first UE and the one or more third UEs, or any combination thereof; identifying a second link identifier based at least in part on the monitoring; and selecting the first link identifier based at least in part on the first link identifier being different from the second link identifier.

Aspect 13: The method of any of aspects 1 through 12, further comprising: generating the indication that the message is associated with the reservation for the sidelink transmissions by the first UE to the one or more third UEs, the indication comprising an identifier for the first UE.

Aspect 14: The method of aspect 13, wherein the identifier comprises a device identifier for the first UE.

Aspect 15: The method of any of aspects 13 through 14, further comprising: receiving, from the network, an indication of the identifier for the first UE.

Aspect 16: A method for wireless communications at a second UE, comprising: receiving, from a first UE, a message for a reservation that includes a first indicator of a time resource and a second indicator of a frequency resource, and that includes an indication that the message is associated with a reservation for one of sidelink transmissions to the first UE or to the one or more third UEs, or sidelink transmissions by the first UE to one or more third UEs; determining a first set of time and frequency resources for the reservation based at least in part on the first indicator, the second indicator, and the reservation being for one of the sidelink transmissions to the first UE or to the one or more third UEs, or the sidelink transmissions by the first UE to the one or more third UEs; selecting, based at least in part on the determined first set of time and frequency resources for the reservation, a second set of time and frequency resources for one or more data messages to be transmitted, wherein the first set of time and frequency resources do not overlap with the first set of time and frequency resources; and transmitting the one or more data messages using at least a portion of the selected second set of time and frequency resources.

Aspect 17: The method of aspect 16, wherein determining the first set of time and frequency resources comprises: identifying a threshold amount of time for the first indicator of the time resource, the threshold amount of time associated with a message format usable for reservations for the sidelink transmissions by the second UE to the first UE or to the one or more third UEs, and the sidelink transmissions by the first UE to the one or more third UEs; and applying an offset value to the first indicator of the time resource to determine a time interval between the message and the time resource of the first set of time and frequency resources.

Aspect 18: The method of aspect 17, further comprising: applying an offset value to the first indicator of the time resource to determine a time interval between the message and the time resource of the first set of time and frequency resources.

Aspect 19: The method of any of aspects 16 through 18, further comprising: adding the first indicator of the time resource to a third indicator of a second time resource to determine the second time resource of the second set of time and frequency resources based at least in part on the reservation being for one of the sidelink to the first UE or to the one or more third UEs, or the sidelink transmissions by the first UE to the one or more third UEs.

Aspect 20: The method of any of aspects 16 through 19, wherein receiving the message comprises: receiving the indication that the message is associated with the reservation for the sidelink transmissions to the first UE or to the one or more third UEs, the indication comprising a source identifier for the first UE and a destination identifier for the second UE.

Aspect 21: The method of aspect 20, further comprising: performing a negotiation procedure with the first UE to determine the source identifier and the destination identifier, wherein the source identifier comprises a device identifier for the first UE and the destination identifier comprises a device identifier for the second UE.

Aspect 22: The method of any of aspects 20 through 21, further comprising: selecting a device identifier for the second UE; transmitting a scheduling request to the first UE, the scheduling request comprising an indication of the device identifier for the second UE, wherein the device identifier for the second UE is received in the message for the reservation.

Aspect 23: The method of any of aspects 16 through 22, wherein receiving the message comprises: receiving the indication that the message is associated with the reservation for the sidelink transmissions to the first UE or to the one or more third UEs, the indication comprising a first link identifier for a sidelink between the first UE and the second UE.

Aspect 24: The method of aspect 23, wherein the first link identifier comprises a device identifier for the second UE.

Aspect 25: The method of any of aspects 23 through 24, further comprising: performing a negotiation procedure with the first UE to determine the first link identifier for the sidelink.

Aspect 26: The method of any of aspects 23 through 25, further comprising: selecting the first link identifier; transmitting a scheduling request to the first UE, the scheduling request comprising an indication of the first link identifier for the second UE, wherein the first link identifier is received in the message for the reservation.

Aspect 27: The method of any of aspects 16 through 26, wherein receiving the message comprises: receiving the indication that the message is associated with the reservation for the sidelink transmissions by the first UE to the one or more third UEs, the indication comprising an identifier for the first UE.

Aspect 28: The method of aspect 27, wherein the identifier comprises a device identifier for the first UE.

Aspect 29: The method of any of aspects 27 through 28, further comprising: receiving, from the network, an indication of the identifier for the first UE.

Aspect 30: An apparatus for wireless communications at a first UE, comprising a processor; memory coupled with the processor; and instructions stored in the memory and executable by the processor to cause the apparatus to perform a method of any of aspects 1 through 15.

Aspect 31: An apparatus for wireless communications at a first UE, comprising at least one means for performing a method of any of aspects 1 through 15.

Aspect 32: A non-transitory computer-readable medium storing code for wireless communications at a first UE, the code comprising instructions executable by a processor to perform a method of any of aspects 1 through 15.

Aspect 33: An apparatus for wireless communications at a second UE, comprising a processor; memory coupled with the processor; and instructions stored in the memory and executable by the processor to cause the apparatus to perform a method of any of aspects 16 through 29.

Aspect 34: An apparatus for wireless communications at a second UE, comprising at least one means for performing a method of any of aspects 16 through 29.

Aspect 35: A non-transitory computer-readable medium storing code for wireless communications at a second UE, the code comprising instructions executable by a processor to perform a method of any of aspects 16 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
- a processor;
- memory coupled with the processor; and
- instructions stored in the memory and executable by the processor to cause the apparatus to:
  - identify a set of time and frequency resources reserved by one or more second UEs for one of sidelink transmissions by the one or more second UEs to the first UE or to one or more third UEs, or sidelink transmissions by the first UE to the one or more third UEs;
  - select a first indicator and a second indicator for the reservation based at least in part on the reservation being for the one of the sidelink transmissions by the one or more second UEs to the first UE or to the one or more third UEs, or the sidelink transmissions by the first UE to the one or more third UEs, the first indicator indicating a time resource and the second indicator indicating a frequency resource associated with the identified set of time and frequency resources for the reservation, wherein selection of the first indicator is based at least in part on an offset value for the time resource, the offset value identified based at least in part on the reservation being for the one of the sidelink transmissions by the one or more second UEs to the first UE or to the one or more third UEs, or the sidelink transmissions by the first UE to the one or more third UEs; and
  - transmit a message that includes the first indicator and the second indicator, and includes an indication that the message is associated with the reservation for the one of the sidelink transmissions by the one or more second UEs to the first UE or to the one or more third UEs, or the sidelink transmissions by the first UE to the one or more third UEs.

2. The apparatus of claim 1, wherein the instructions are further executable by the processor to cause the apparatus to:
- receive, from a base station, the one or more second UEs, or the one or more third UEs, an indication of the offset value for the time resource.

3. The apparatus of claim 1, wherein the instructions to select the first indicator are executable by the processor to cause the apparatus to:
- determine that a time interval between the message and the time resource satisfies a threshold amount of time, wherein selecting the first indicator of the time resource is based at least in part on the time interval satisfying the threshold amount of time, and the threshold amount of time is associated with a message format usable for reservations for the sidelink transmissions by the one or more second UEs to the first UE or to the one or more third UEs, and the sidelink transmissions by the first UE to the one or more third UEs.

4. The apparatus of claim 3, wherein the instructions are further executable by the processor to cause the apparatus to:
- receive control signaling comprising an indication of the threshold amount of time.

5. The apparatus of claim 1, wherein the instructions are further executable by the processor to cause the apparatus to:
- generate the indication that the message is associated with the reservation for the sidelink transmissions by the one or more second UEs to the first UE or to the one or more third UEs, the indication comprising a source identifier for the first UE and a destination identifier for the one or more second UEs.

6. The apparatus of claim 5, wherein the instructions are further executable by the processor to cause the apparatus to:
- perform a negotiation procedure with the one or more second UEs to determine the source identifier and the destination identifier.

7. The apparatus of claim 5, wherein the source identifier comprises a device identifier for the first UE and the destination identifier comprises a device identifier for the one or more second UEs.

8. The apparatus of claim 1, wherein the instructions are further executable by the processor to cause the apparatus to:
- generate the indication that the message is associated with the reservation for the sidelink transmissions by the one or more second UEs to the first UE or to the one or more third UEs, the indication comprising a first link identifier for a sidelink between the first UE and the one or more second UEs.

9. The apparatus of claim 8, wherein the first link identifier comprises a device identifier for the one or more second UEs.

10. The apparatus of claim 8, wherein the instructions are further executable by the processor to cause the apparatus to:

perform a negotiation procedure with the one or more second UEs to determine the first link identifier for the sidelink.

11. The apparatus of claim 8, wherein the instructions are further executable by the processor to cause the apparatus to:

monitor the sidelink between the first UE and the one or more second UEs, one or more sidelinks between the first UE and the one or more third UEs, or any combination thereof;

identify a second link identifier based at least in part on the monitoring; and select the first link identifier based at least in part on the first link identifier being different from the second link identifier.

12. The apparatus of claim 1, wherein the instructions are further executable by the processor to cause the apparatus to:

generate the indication that the message is associated with the reservation for the sidelink transmissions by the first UE to the one or more third UEs, the indication comprising an identifier for the first UE.

13. The apparatus of claim 12, wherein the identifier comprises a device identifier for the first UE.

14. The apparatus of claim 12, wherein the instructions are further executable by the processor to cause the apparatus to:

receive, from a network, an indication of the identifier for the first UE.

15. An apparatus for wireless communications at a second user equipment (UE), comprising:

a processor;

memory coupled with the processor; and instructions stored in the memory and executable by the processor to cause the apparatus to:

receive, from a first UE, a message for a reservation that includes a first indicator of a time resource and a second indicator of a frequency resource, and that includes an indication that the message is associated with the reservation for one of sidelink transmissions to the first UE or to one or more third UEs, or sidelink transmissions by the first UE to the one or more third UEs;

determine a first set of time and frequency resources for the reservation based at least in part on the first indicator, the second indicator, and the reservation being for one of the sidelink transmissions to the first UE or to the one or more third UEs, or the sidelink transmissions by the first UE to the one or more third UEs, wherein determination of the first set of time and frequency resources comprises application of an offset value to the first indicator of the time resource to determine a time interval between the message and the time resource of the first set of time and frequency resources, the offset value associated with the reservation being for one of the sidelink transmissions to the first UE or to the one or more third UEs, or the sidelink transmissions by the first UE to the one or more third UEs;

select, based at least in part on the determined first set of time and frequency resources for the reservation, a second set of time and frequency resources for one or more data messages to be transmitted, wherein the first set of time and frequency resources do not overlap with the second set of time and frequency resources; and transmit the one or more data messages using at least a portion of the selected second set of time and frequency resources.

16. The apparatus of claim 15, wherein the instructions to determine the first set of time and frequency resources are executable by the processor to cause the apparatus to:

identify a threshold amount of time for the first indicator of the time resource, the threshold amount of time associated with a message format usable for reservations for the sidelink transmissions to the first UE or to the one or more third UEs, and the sidelink transmissions by the first UE to the one or more third UEs.

17. The apparatus of claim 16, wherein the instructions are further executable by the processor to cause the apparatus to:

receive an indication of the threshold amount of time, the offset value, or both, wherein applying the offset value is based at least in part on the indication of the threshold amount of time.

18. The apparatus of claim 15, wherein the instructions are further executable by the processor to cause the apparatus to:

add the first indicator of the time resource to a third indicator of a second time resource to determine the second time resource of the second set of time and frequency resources based at least in part on the reservation being for one of the sidelink transmissions to the first UE or to the one or more third UEs, or the sidelink transmissions by the first UE to the one or more third UEs.

19. The apparatus of claim 15, wherein the instructions to receive the message are executable by the processor to cause the apparatus to:

receive the indication that the message is associated with the reservation for the sidelink transmissions to the first UE or to the one or more third UEs, the indication comprising a source identifier for the first UE and a destination identifier for the second UE.

20. The apparatus of claim 19, wherein the instructions are further executable by the processor to cause the apparatus to:

perform a negotiation procedure with the first UE to determine the source identifier and the destination identifier, wherein the source identifier comprises a device identifier for the first UE and the destination identifier comprises a device identifier for the second UE.

21. The apparatus of claim 19, wherein the instructions are further executable by the processor to cause the apparatus to:

select a device identifier for the second UE; and transmit a scheduling request to the first UE, the scheduling request comprising an indication of the device identifier for the second UE, wherein the device identifier for the second UE is received in the message for the reservation.

22. The apparatus of claim 15, wherein the instructions to receive the message are executable by the processor to cause the apparatus to:

receive the indication that the message is associated with the reservation for the sidelink transmissions to the first UE or to the one or more third UEs, the indication comprising a first link identifier for a sidelink between the first UE and the second UE.

23. The apparatus of claim 15, wherein the instructions to receive the message are executable by the processor to cause the apparatus to:

receive the indication that the message is associated with the reservation for the sidelink transmissions by the first UE to the one or more third UEs, the indication comprising an identifier for the first UE.

24. The apparatus of claim 23, wherein the identifier comprises a device identifier for the first UE, wherein the instructions are further executable by the processor to cause the apparatus to:

receive, from a network, an indication of the identifier for the first UE.

25. A method for wireless communications at a first user equipment (UE), comprising:

identifying a set of time and frequency resources reserved by one or more second UEs for one of sidelink transmissions by the one or more second UEs to the first UE or to one or more third UEs, or sidelink transmissions by the first UE to the one or more third UEs;

selecting a first indicator and a second indicator for the reservation based at least in part on the reservation being for the one of the sidelink transmissions by the one or more second UEs to the first UE or to the one or more third UEs, or the sidelink transmissions by the first UE to the one or more third UEs, the first indicator of a time resource and the second indicator of a frequency resource associated with the identified set of time and frequency resources for the reservation, wherein selecting the first indicator comprises identifying an offset value for the time resource based at least in part on the reservation being for the one of the sidelink transmissions by the one or more second UEs to the first UE or to the one or more third UEs, or the sidelink transmissions by the first UE to the one or more third UEs, and selecting the first indicator for the reservation based at least in part on the offset value for the time resource; and transmitting a message that includes the first indicator and the second indicator, and includes an indication that the message is associated with the reservation for the one of the sidelink transmissions by the one or more second UEs to the first UE or to the one or more third UEs, or the sidelink transmissions by the first UE to the one or more third UEs.

26. A method for wireless communications at a second user equipment (UE), comprising:

receiving, from a first UE, a message for a reservation that includes a first indicator of a time resource and a second indicator of a frequency resource, and that includes an indication that the message is associated with a reservation for one of sidelink transmissions to the first UE or one or more third UEs, or sidelink transmissions by the first UE to the one or more third UEs;

determining a first set of time and frequency resources for the reservation based at least in part on the first indicator, the second indicator, and the reservation being for one of the sidelink transmissions to the first UE or the one or more third UEs, or the sidelink transmissions by the first UE to the one or more third UEs, wherein determining the first set of time and frequency resources comprises applying an offset value to the first indicator of the time resource to determine a time interval between the message and the time resource of the first set of time and frequency resources, the offset value associated with the reservation being for one of the sidelink transmissions to the first UE or to the one or more third UEs, or the sidelink transmissions by the first UE to the one or more third UEs;

selecting, based at least in part on the determined first set of time and frequency resources for the reservation, a second set of time and frequency resources for one or more data messages to be transmitted to the second UE, wherein the first set of time and frequency resources do not overlap with the second set of time and frequency resources; and transmitting the one or more data messages to the first UE using at least a portion of the selected second set of time and frequency resources.

* * * * *